US012688705B2

(12) United States Patent
Yeh et al.

(10) Patent No.: US 12,688,705 B2
(45) Date of Patent: Jul. 21, 2026

(54) METRICS FOR MODELING LANE CLOSURE ZONES

(71) Applicant: GM Cruise Holdings LLC, San Francisco, CA (US)

(72) Inventors: Fu-Chun Yeh, San Diego, CA (US); Changkai Zhou, Mountain View, CA (US); Shuqin Xie, Sunnyvale, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 505 days.

(21) Appl. No.: 18/323,853

(22) Filed: May 25, 2023

(65) Prior Publication Data

US 2024/0395054 A1 Nov. 28, 2024

(51) Int. Cl.
*G06V 20/56* (2022.01)
*G06V 10/764* (2022.01)
*G06V 20/58* (2022.01)

(52) U.S. Cl.
CPC .......... *G06V 20/588* (2022.01); *G06V 10/764* (2022.01); *G06V 20/582* (2022.01)

(58) Field of Classification Search
CPC .. G06V 20/588; G06V 10/764; G06V 20/582; G06V 20/58
See application file for complete search history.

(56) References Cited

U.S. PATENT DOCUMENTS

| | | | |
|---|---|---|---|
| 2014/0067187 A1* | 3/2014 | Ferguson | ........... B60W 60/0011 701/28 |
| 2020/0372262 A1* | 11/2020 | Ma | ........................ B60W 40/04 |
| 2020/0393261 A1* | 12/2020 | Zhang | ................ G01C 21/3492 |

OTHER PUBLICATIONS

Shi ("Work zone detection for autonomous vehicles." In 2021 IEEE International Intelligent Transportation Systems Conference (ITSC), pp. 1585-1591. IEEE, 2021.) (Year: 2021).*

* cited by examiner

*Primary Examiner* — Wassim Mahrouka
(74) *Attorney, Agent, or Firm* — CANTOR COLBURN LLP

(57) ABSTRACT

Systems and methods for determining metrics for lane closure zone detection and evaluating the performance of lane closure zone detection. A lane closure zone can include any area where a lane is closed off. The changes to the typical travel paths for vehicles on the roadway can indicate that vehicles are to travel along a different path than that indicated on the maps the AVs use to operate. Thus, it is important for accurate driving operations of the AVs for the AVs to be able to interpret the changes to the typical travel paths indicated by the lane closure. Navigating through lane closure zones generally includes mapping (by the AV) objects in the lane closure zone, including the objects indicating the lane closure, and understanding related surrounding non-player characters (e.g., other vehicles).

20 Claims, 10 Drawing Sheets

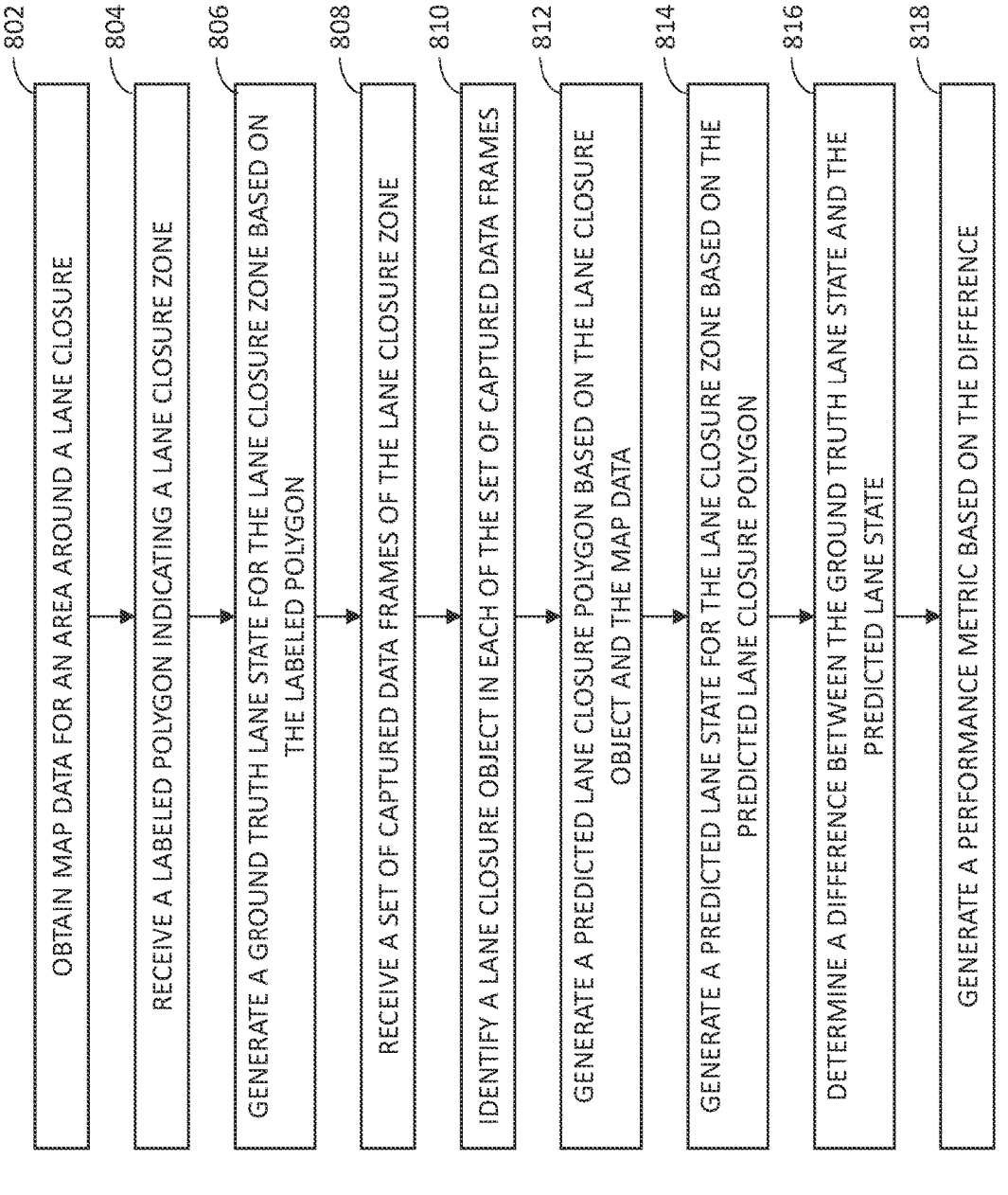

802 OBTAIN MAP DATA FOR AN AREA AROUND A LANE CLOSURE

804 RECEIVE A LABELED POLYGON INDICATING A LANE CLOSURE ZONE

806 GENERATE A GROUND TRUTH LANE STATE FOR THE LANE CLOSURE ZONE BASED ON THE LABELED POLYGON

808 RECEIVE A SET OF CAPTURED DATA FRAMES OF THE LANE CLOSURE ZONE

810 IDENTIFY A LANE CLOSURE OBJECT IN EACH OF THE SET OF CAPTURED DATA FRAMES

812 GENERATE A PREDICTED LANE CLOSURE POLYGON BASED ON THE LANE CLOSURE OBJECT AND THE MAP DATA

814 GENERATE A PREDICTED LANE STATE FOR THE LANE CLOSURE ZONE BASED ON THE PREDICTED LANE CLOSURE POLYGON

816 DETERMINE A DIFFERENCE BETWEEN THE GROUND TRUTH LANE STATE AND THE PREDICTED LANE STATE

818 GENERATE A PERFORMANCE METRIC BASED ON THE DIFFERENCE

METRICS FOR MODELING LANE CLOSURE ZONES

CROSS-REFERENCE TO RELATED APPLICATIONS

This application is related to U.S. Non-Provisional Patent Application entitled "Metrics for Modeling Construction Zones", filed concurrently herewith, the contents of which are incorporated herein by reference in their entirety and for all purposes.

TECHNICAL FIELD OF THE DISCLOSURE

The present disclosure relates generally to autonomous vehicles (AV) and, more specifically, to using metrics to evaluate and model lane closures for navigating AVs.

BACKGROUND

An AV is a vehicle that is capable of sensing and navigating its environment with little or no user input. An AV may sense its environment using sensing devices such as Radio Detection and Ranging (RADAR), Light Detection and Ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to drive the vehicle. As used herein, the phrase "AV" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 8 is a flowchart showing a method for lane closure zone identification, according to some examples of the present disclosure;

DESCRIPTION OF EXAMPLE EMBODIMENTS OF THE DISCLOSURE

Figure 1:
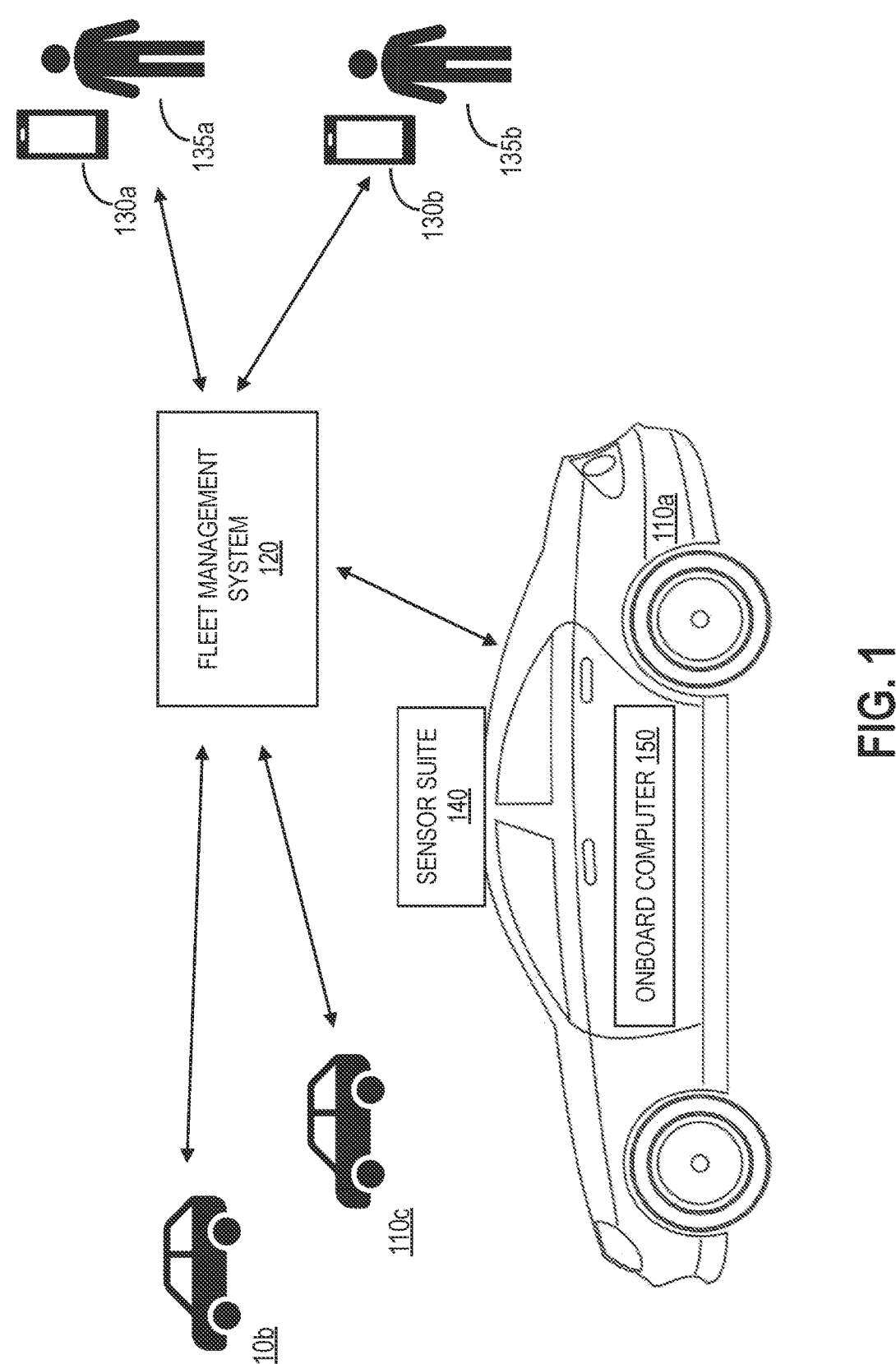
FIG. 1 illustrates a system including a fleet of AVs that can provide services to users, according to some embodiments of the present disclosure.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

AVs can provide driverless services, such as ride services, delivery services, and so on. A person can request an AV to pick him/her up from a location and drop him/her off at another location. With the autonomous driving features of the AV, the person does not have to drive during the ride and can be a passenger of the AV. The AV can navigate from the pick-up location to the drop-off location with no or little user input. AVs can provide other driverless services too, such as delivery service. A person can request an AV to deliver one or more items from one location to another location, and the person does not have to drive or be a passenger of the AV for the delivery.

Overview

AVs often need to drive near or through areas where lanes are closed for various reasons. A lane closure zone can include any area where a lane is closed off. A lane can be closed with construction objects such as cones, posts, and/or barriers, with temporary signs indicating the closure, with an emergency vehicle blocking the lane, with caution tape, and/or with flares. The changes to the typical travel paths for vehicles on the roadway can indicate that vehicles are to travel along a different path than that indicated on the maps the AVs use to operate. Thus, it is important for accurate driving operations of the AVs for the AVs to be able to interpret, in real time (or near real time), the changes to the typical travel paths indicated by the lane closure. Navigating through lane closure zones generally includes mapping (by the AV) objects in the lane closure zone, including the objects indicating the lane closure, and understanding related surrounding non-player characters (e.g., other vehicles).

According to various implementations, systems and methods are provided for determining metrics for lane closure zone detection and evaluating the performance of lane closure zone detection. In some examples, for a selected lane closure zone, the zone is manually labeled, and the human labels are converted to a format that can be input to a neural network. The neural network input represents polygons indicating the lane closure zone. The neural network converts the input to polygon nodes and polygon boundaries, which can be used to train the neural network. In particular, when an AV drives to the lane closure zone, the AV detects the lane closure objects and generates a predicted lane closure zone, including, for example, predicted edges. The AV data, including the detected lane closure objects, can be determined based on multiple data frames, captured over a selected time period. The data frames can vary based on the AV location with respect to the lane closure objects. The neural network determines the gap between the polygon boundary and the predicted edges to determine the accuracy of the predicted lane closure zone. The predicted connectivity of the lane closure objects is evaluated to determine accuracy of the detected lane closure zone and generate a performance metric. In some examples, the labeled and predicted polygons of the lane closure zones can be interpreted in a graphical format. In various implementations, the neural network can include a convolutional neural network (CNN) and/or a graph neural network (GNN). In some examples, the generation of predicted edges and/or the generation of a predicted lane closure zone can be simulated. In some examples, the performance metric can be used to evaluate the neural network. For instance, the performance metric can be used to determine the accuracy of the neural network in detecting lane closures. In some examples, the performance metric can be used to determine whether a neural network should undergo further training.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example System with AV Fleet

FIG. 1 illustrates a system 100 including a fleet of AVs that can provide services to users, according to some embodiments of the present disclosure. The system 100 includes AVs 110a, 110b, 110c (collectively referred to as "AVs 110" or "AV 110"), a fleet management system 120, and client devices 130a and 130b (collectively referred to as "client devices 130" or "client device 130"). The client devices 130a and 130b are associated with users 135a and 135b, respectively. The AV 110a includes a sensor suite 140 and an onboard computer 150. Even though not shown in FIG. 1, the AV 110b or 110b can also include a sensor suite 140 and an onboard computer 150. In other embodiments, the system 100 may include more, fewer, or different components. For example, the fleet of AVs 110 may include a different number of AVs 110 or a different number of client devices 130.

The fleet management system 120 manages the fleet of AVs 110. The fleet management system 120 may manage one or more services that the fleet of AVs 110 provides to the users 135. An example service is a ride service, e.g., an AV 110 provides a ride to a user 135 from a first location to a second location. Another example service is a delivery service, e.g., an AV 110 delivers one or more items from or to the user 135. The fleet management system 120 can select one or more AVs 110 (e.g., AV 110A) to perform a particular service, and instructs the selected AV to drive to one or more particular locations associated with the service (e.g., a first address to pick up user 135A, and a second address to pick up user 135B). The fleet management system 120 also manages fleet maintenance tasks, such as fueling, inspecting, and servicing of the AVs. As shown in FIG. 1, the AVs 110 communicate with the fleet management system 120.

The AVs 110 and fleet management system 120 may connect over a network, such as the Internet.

In some embodiments, the fleet management system 120 receives service requests for the AVs 110 from the client devices 130. In an example, the user 135A accesses an app executing on the client device 130A and requests a ride from a pickup location (e.g., the current location of the client device 130A) to a destination location. The client device 130A transmits the ride request to the fleet management system 120. The fleet management system 120 selects an AV 110 from the fleet of AVs 110 and dispatches the selected AV 110A to the pickup location to carry out the ride request. In some embodiments, the ride request further includes a number of passengers in the group. In some embodiments, the ride request indicates whether a user 135 is interested in a shared ride with another user traveling in the same direction or along a same portion of a route. The ride request, or settings previously entered by the user 135, may further indicate whether the user 135 is interested in interaction with another passenger.

The fleet management system 120 may provide the AVs 110 information for navigating the AVs 110 during the operations of the AVs. For instance, the fleet management system 120 may provide maps (e.g., semantic maps, vector maps, etc.) of environments where AVs operate. The fleet management system 120 may also facilitate AVs to detect temporary traffic restrictions (TTRs), such as lane closure zones, for the AVs to safely navigate through or pass by the TTR zones. Certain aspects of the fleet management system 120 are described further in relation to FIG. 2.

A client device 130 is a device capable of communicating with the fleet management system 120, e.g., via one or more networks. The client device 130 can transmit data to the fleet management system 120 and receive data from the fleet management system 120. The client device 130 can also receive user input and provide outputs. In some embodiments, outputs of the client devices 130 are in human-perceptible forms, such as text, graphics, audio, video, and so on. The client device 130 may include various output components, such as monitors, speakers, headphones, projectors, and so on. The client device 130 may be a desktop or a laptop computer, a smartphone, a mobile telephone, a personal digital assistant (PDA), or another suitable device.

In some embodiments, a client device 130 executes an application allowing a user 135 of the client device 130 to interact with the fleet management system 120. For example, a client device 130 executes a browser application to enable interaction between the client device 130 and the fleet management system 120 via a network. In another embodiment, a client device 130 interacts with the fleet management system 120 through an application programming interface (API) running on a native operating system of the client device 130, such as IOS® or ANDROID™. The application may be provided and maintained by the fleet management system 120. The fleet management system 120 may also update the application and provide the update to the client device 130.

In some embodiments, a user 135 may submit service requests to the fleet management system 120 through a client device 130. A client device 130 may provide its user 135 a user interface (UI), through which the user 135 can make service requests, such as ride request (e.g., a request to pick up a person from a pickup location and drop off the person at a destination location), delivery request (e.g., a request to deliver one or more items from a location to another location), and so on. The UI may allow users 135 to provide locations (e.g., pickup location, destination location, etc.) or other information that would be needed by AVs 110 to provide services requested by the users 135.

The client device 130 may provide the user 135 an UI through which the user 135 can interact with the AV 110 that provides a ride to the user 135. The AV 110 may transmit one or more messages to the UI. The messages may be associated with one or more behaviors performed by the AV 110 for providing the ride to the user 135. The user 135 may view the messages in the UI. The UI may also allow the user 135 to interact with the messages. In some embodiments, the UI allows the user 135 to provide a comment or rate on the AV behaviors or the ride. The UI may also allow the user 135 to modify one or more settings of the ride in light of the AV behaviors.

The client device 130 may also provide the user 135 an UI through which the user 135 can interact with the fleet management system 120. For instance, the UI enables the user to submit a request for assistance to the fleet management system 120 through a network or a telephone service (e.g., a customer service hotline). The UI can further facilitate a communication between the user 135 and an agent of the fleet management system 120 who can provide the requested assistance. The UI may further enable the user to comment on or rate the agent.

The AV 110 is preferably a fully autonomous automobile, but may additionally or alternatively be any semi-autonomous or fully autonomous vehicle, e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The sensor suite 140 may include a computer vision ("CV") system, localization sensors, and driving sensors. For example, the sensor suite 140 may include interior and exterior cameras, RADAR sensors, sonar sensors, LIDAR sensors, thermal sensors, wheel speed sensors, inertial measurement units (IMUs), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110. Certain sensors of the sensor suite 140 are described further in relation to FIG. 3.

The onboard computer 150 is connected to the sensor suite 140 and functions to control the AV 110 and to process sensed data from the sensor suite 140 and/or other sensors to determine the state of the AV 110. Based upon the vehicle state and programmed instructions, the onboard computer 150 modifies or controls behavior of the AV 110. The onboard computer 150 may be preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

In some embodiments, the onboard computer 150 is in communication with the fleet management system 120, e.g., through a network. The onboard computer 150 may receive instructions from the fleet management system 120 and control behavior of the AV 110 based on the instructions. For example, the onboard computer 150 may receive from the fleet management system 120 an instruction for providing a ride to a user 135. The instruction may include information of the ride (e.g., pickup location, drop-off location, intermediate stops, etc.), information of the user 135 (e.g., identifying information of the user 135, contact information of the user 135, etc.). The onboard computer 150 may determine a navigation route of the AV 110 based on the instruction. As another example, the onboard computer 150 may receive from the fleet management system 120 a request for sensor data to be used by the ride evaluation platform. The onboard computer 150 may control one or more sensors of the sensor suite 140 to detect the user 135, the AV 110, or an environment surrounding the AV 110 based on the instruction and further provide the sensor data from the sensor suite 140 to the fleet management system 120. The onboard computer 150 may transmit other information requested by the fleet management system 120, such as perception of the AV 110 that is determined by a perception module of the onboard computer 150, historical data of the AV 110, and so on.

The onboard computer 150 supports a lane closure zone detection platform for detection of lane closure objects and determination of predicted edges to understand TTRs in environments where AVs 110 operates. The onboard computer 150 can detect lane closure objects based on sensor data generated by the sensor suite 140, and generate predicted edges. The sensor data can include multiple frames of sensor data, captured over a selected time period and/or over a selected distance traveled. The onboard computer 150 can input the sensor data, including the detected lane closure objects, into a neural network for generation of the predicted edges. The neural network performance can be evaluated based on, for example, the instant distance between the generated predicted edges and labeled edges. In various examples, when the neural network is trained, the onboard computer 150 can use the output of the trained model to plan and control navigation of the AV 110 surrounding or within the lane closure zone. In some examples, the onboard computer 150 can receive lane closure zone information from one or more other AVs 110 and/or from the fleet management system 120 (e.g., a map of the construction zone). Certain aspects of the onboard computer 150 are described further in relation to FIG. 4.

Example Fleet Management System

Figure 2:
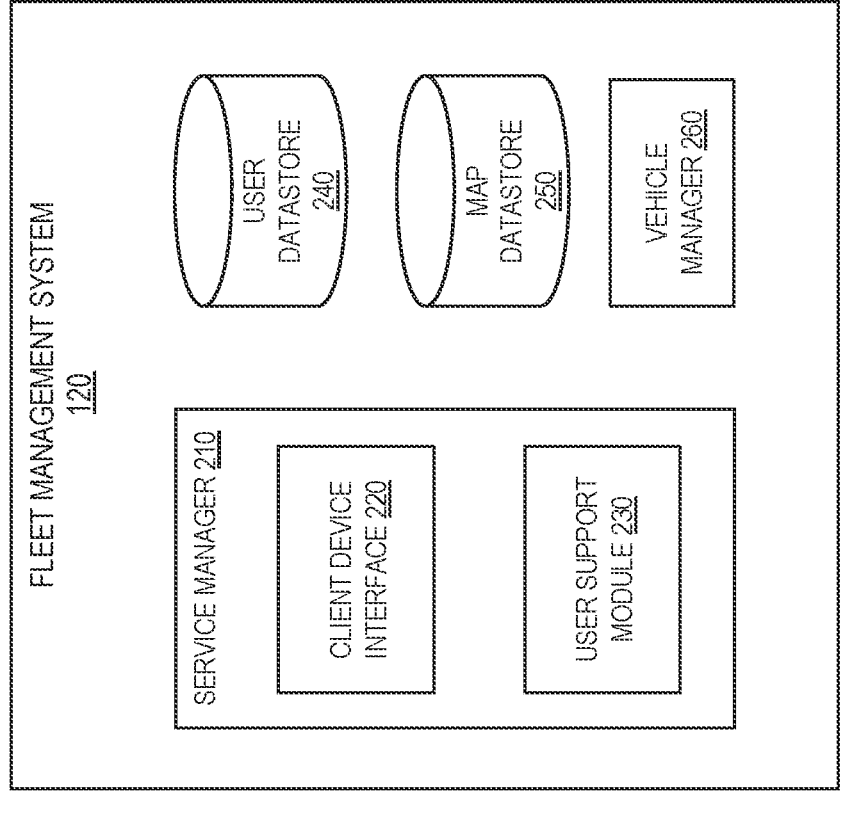
FIG. 2 is a block diagram showing a fleet management system, according to some embodiments of the present disclosure.

FIG. 2 is a block diagram showing the fleet management system, according to some embodiments of the present disclosure. The fleet management system 120 includes a service manager 210, a user datastore 240, a map datastore 250, and a vehicle manager 260. In alternative configurations, different and/or additional components may be included in the fleet management system 120. Further, functionality attributed to one component of the fleet management system 120 may be accomplished by a different component included in the fleet management system 120 or a different system than those illustrated, such as the onboard computer 150.

The service manager 210 manages services that the fleet of AVs 110 can provide. The service manager 210 includes a client device interface 220 and a user support module 230. The client device interface 220 provides interfaces to client devices, such as headsets, smartphones, tablets, computers, and so on. For example, the client device interface 220 may provide one or more apps or browser-based interfaces that can be accessed by users, such as the users 135, using client devices, such as the client devices 130. The client device interface 220 enables the users to submit requests to a ride service provided or enabled by the fleet management system 120. In particular, the client device interface 220 enables a user to submit a ride request that includes an origin (or pickup) location and a destination (or drop-off) location. The ride request may include additional information, such as a number of passengers traveling with the user, and whether or not the user is interested in a shared ride with one or more other passengers not known to the user.

The client device interface 220 can also enable users to select ride settings. The client device interface 220 can provide one or more options for the user to engage in a virtual environment, such as whether to interact with another person, whether to involve in an entertainment activity, and so on. The client device interface 220 may enable a user to opt-in to some, all, or none of the virtual activities offered by the ride service provider. The client device interface 220 may further enable the user to opt-in to certain monitoring features, e.g., to opt-in to have the interior sensors 340 obtain sensor data of the user. The client device interface 220 may explain how this data is used by the service manager 210 (e.g., for providing support to the user, etc.) and may enable users to selectively opt-in to certain monitoring features, or to opt-out of all of the monitoring features. In some embodiments, the user support platform may provide a modified version of a virtual activity if a user has opted out of some or all of the monitoring features.

The user support module 230 may receive support requests from passengers of AVs through the client device interface 220 or the onboard computer 150. The user support module 230 manages the support requests. In some embodiments, the user support module 230 maintains a queue of pending support requests, in which the pending support requests may be arranged in an order. A pending support request is a support request that has not been completed. A support request may be considered completed after the support requested by the passenger has been provided or the issue that triggered the support request has been resolved.

The user support module 230 may assign the pending support requests to agents based on the order in the queue. The agent can interact with the passenger and provide support to the passenger. An agent may be associated with a device in communication with the user support module 230. The device may be a desktop or a laptop computer, a smartphone, a mobile telephone, a PDA, or another suitable device. The user support module 230 may send information related to support requests assigned to the agent to the agent's device. The information may include the support requests and guidance on how to provide the requested support.

In some embodiments, the user support module 230 determines a state (e.g., a sentiment) of a passenger who submitted a support request and processes the support request based on the passenger's state. The user support module 230 may determine the passenger's state based on data of the passenger, data of the AV, data of one or more objects in an environment surrounding the passenger or AV, or some combination thereof. The data may include sensor data generated by the sensor suite 140 from detecting the passenger, AV, one or more objects in the environment, or some combination thereof. For instance, the user support module 230 may interface with AVs 110 (e.g., with onboard computers of the AVs 110) and receive sensor data from the AVs 110. The sensor data may be camera images, captured sound, measured temperature, other outputs from the sensor suite 140, or some combination thereof. The data may also include data retrieved by the user support module 230 from the user datastore 240 or map datastore 250. In an embodiment, the user support module 230 may provide the data to a trained model and the train model analyzes the sentiment of the passenger. The trained model may classify the passenger's sentiment. Example categories include negative (e.g., anxious, angry, etc.), neural (e.g., calm), positive (e.g., confident, happy, etc.), and so on. The trained model may also estimate a degree of the passenger's sentiment, such as an anxiety level or anger level.

The user support module 230 may assign the support request to an agent based on the passenger's state. For instance, based on a determination that the passenger is anxious, the user support module 230 may assign the support request to a currently available agent or the next available agent so that the waiting time of the passenger can be minimized. The agent, who receives the support request, can help the passenger to deal with the issue. The agent may communicate with the passenger, e.g., through an audio or video call.

The user datastore 240 stores ride information associated with users of the ride service, e.g., the users 135. In some embodiments, the user datastore 240 stores user sentiments associated with rides taken by the user 135. The user sentiments may be determined by the user support module 230. The user datastore 240 may store an origin location and a destination location for a user's current ride. The user datastore 240 may also store historical ride data for a user, including origin and destination locations, dates, and times of previous rides taken by a user. The historical data of the user may also include information associated with historical support requests made by the user during the previous rides, such as sensor data associated with the historical support requests, communications of the user with agents that serviced the historical support requests, states of the user during the communications, information of AVs 110 associated with the historical support requests, and so on. The historical data of the user may also include information associated with communications of AVs with the user for AV behaviors in historical rides taken by the user. In some cases, the user datastore 240 may further store future ride data, e.g., origin and destination locations, dates, and times of planned rides that a user has scheduled with the ride service provided by the AVs 110 and fleet management system 120. Some or all of the data of a user in the user datastore 240 may be received through the client device interface 220, an onboard computer (e.g., the onboard computer 150), a sensor suite of AVs 110 (e.g., the sensor suite 140), a third-party system associated with the user and the fleet management system 120, or other systems or devices.

In some embodiments, the user datastore 240 also stores data indicating user preferences associated with rides in AVs. The fleet management system 120 may include one or more learning modules (not shown in FIG. 2) to learn user interests based on user data. For example, a learning module may compare locations in the user datastore 240 with map datastore 250 to identify places the user has visited or plans to visit. For example, the learning module may compare an origin or destination address for a user in the user datastore 240 to an entry in the map datastore 250 that describes a building at that address. The map datastore 250 may indicate a building type, e.g., to determine that the user was picked up or dropped off at an event center, a restaurant, or a movie theater. In some embodiments, the learning module may further compare a date of the ride to event data from another data source (e.g., a third-party event data source, or a third-party movie data source) to identify a more particular interest, e.g., to identify a performer who performed at the event center on the day that the user was picked up from an event center, or to identify a movie that started shortly after the user was dropped off at a movie theater. This interest (e.g., the performer or movie) may be added to the user datastore 240. As another example, a learning module may learn user tolerance or preference for AV behaviors, e.g., based on information associated with communications of AVs with the user for AV behaviors in historical rides taken by the user. The learning module may learn that the user has a high tolerance for an AV behavior based on information indicating that the user had no bad feelings for the AV behavior undesirable in one or more previous rides. Similarly, the learning module may learn that the user has a low tolerance for a type of AV behavior based on information indicating that the user had negative sentiments towards the AV behavior in one or more previous rides.

The map datastore 250 stores one or more maps of environments through which the AVs 110 may travel. A map may be a semantic map or vector map. The map datastore 250 includes data describing roadways, such as e.g., locations of roadways, connections between roadways, roadway names, speed limits, traffic flow regulations, toll information, etc. The map datastore 250 may further include data describing buildings (e.g., locations of buildings, building geometry, building types), and data describing other objects (e.g., location, geometry, object type) that may be in the environments of AV 110. The map datastore 250 may also include data describing other features, such as bike lanes, sidewalks, crosswalks, traffic lights, parking lots, signs, billboards, etc.

Some of the map datastore 250 may be gathered by the fleet of AVs 110. For example, images obtained by the exterior sensors 310 of the AVs 110 may be used to learn information about the AVs' environments. As one example, AVs may capture images in a residential neighborhood during a holiday season, and the images may be processed to identify which homes have holiday decorations. The images may be processed to identify particular features in the environment. For the holiday decoration example, such features may include light color, light design (e.g., lights on trees, roof icicles, etc.), types of blow-up figures, etc. The fleet management system 120 and/or AVs 110 may have one or more image processing modules to identify features in the captured images or other sensor data. This feature data may be stored in the map datastore 250. In some embodiments, certain feature data (e.g., seasonal data, such as holiday decorations, or other features that are expected to be temporary) may expire after a certain period of time. In some embodiments, data captured by a second AV 110 may indicate that a previously-observed feature is no longer present (e.g., a blow-up Santa has been removed) and in response, the fleet management system 120 may remove this feature from the map datastore 250.

The vehicle manager 260 manages and communicates with the fleet of AVs 110. The vehicle manager 260 assigns the AVs 110 to various tasks and directs the movements of the AVs 110 in the fleet. The vehicle manager 260 includes a vehicle manager 260 and an AV 110 interface 290. In some embodiments, the vehicle manager 260 includes additional functionalities not specifically shown in FIG. 2. For example, the vehicle manager 260 instructs AVs 110 to drive to other locations while not servicing a user, e.g., to improve geographic distribution of the fleet, to anticipate demand at particular locations, etc. The vehicle manager 260 may also instruct AVs 110 to return to an AV 110 facility for fueling, inspection, maintenance, or storage. As another example, the vehicle manager 260 may include functionalities of the onboard computer 150, such as functionalities related to modeling temporary traffic restrictions and lane closure zones.

In some embodiments, the vehicle manager 260 selects AVs from the fleet to perform various tasks and instructs the AVs to perform the tasks. For example, the vehicle manager 260 receives a ride request from the client device interface 220. The vehicle manager 260 selects an AV 110 to service the ride request based on the information provided in the ride request, e.g., the origin and destination locations. If multiple AVs 110 in the AV 110 fleet are suitable for servicing the ride request, the vehicle manager 260 may match users for shared rides based on an expected compatibility. For example, the vehicle manager 260 may match users with similar user interests, e.g., as indicated by the user datastore 240. In some embodiments, the vehicle manager 260 may match users for shared rides based on previously-observed compatibility or incompatibility when the users had previously shared a ride.

The vehicle manager 260 or another system may maintain or access data describing each of the AVs in the fleet of AVs 110, including current location, service status (e.g., whether the AV 110 is available or performing a service; when the AV 110 is expected to become available; whether the AV 110 is schedule for future service), fuel or battery level, etc. The vehicle manager 260 may select AVs for service in a manner that optimizes one or more additional factors, including fleet distribution, fleet utilization, and energy consumption. The vehicle manager 260 may interface with one or more predictive algorithms that project future service requests and/or vehicle use, and select vehicles for services based on the projections.

The vehicle manager 260 transmits instructions dispatching the selected AVs. In particular, the vehicle manager 260 instructs a selected AV 110 to drive autonomously to a pickup location in the ride request and to pick up the user and, in some cases, to drive autonomously to a second pickup location in a second ride request to pick up a second user. The first and second user may jointly participate in a virtual activity, e.g., a cooperative game or a conversation. The vehicle manager 260 may dispatch the same AV 110 to pick up additional users at their pickup locations, e.g., the AV 110 may simultaneously provide rides to three, four, or more users. The vehicle manager 260 further instructs the AV 110 to drive autonomously to the respective destination locations of the users.

Example Sensor Suite

Figure 3:
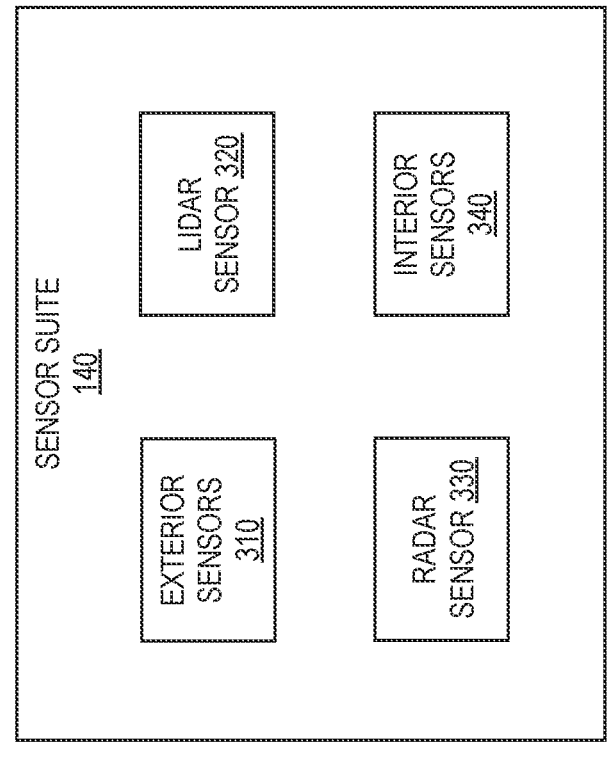
FIG. 3 is a block diagram showing a sensor suite, according to some embodiments of the present disclosure.

FIG. 3 is a block diagram showing the sensor suite 140, according to some embodiments of the present disclosure. The sensor suite 140 may be an onboard sensor suite of an AV, e.g., AV 110 in FIG. 1. The sensor suite 140 includes exterior sensors 310, a LIDAR sensor 320, a RADAR sensor 330, and interior sensors 340. The sensor suite 140 may include any number of the types of sensors shown in FIG. 3, e.g., one or more LIDAR sensors 320, one or more RADAR sensors 330, etc. The sensor suite 140 may have more types of sensors than those shown in FIG. 3, such as the sensors described with respect to FIG. 1. In other embodiments, the sensor suite 140 may not include one or more of the sensors shown in FIG. 3.

The exterior sensors 310 may detect objects in an environment around the AV. The environment may include a scene in which the AV operates. Example objects include objects related to weather (e.g., fog, rain, snow, haze, etc.), persons, buildings, traffic cones, traffic lights, traffic signs, barriers, vehicles, street signs, trees, plants, animals, or other types of objects that may be present in the environment around the AV. In some embodiments, the exterior sensors 310 include exterior cameras having different views, e.g., a front-facing camera, a back-facing camera, and side-facing cameras. One or more exterior sensors 310 may be implemented using a high-resolution imager with a fixed mounting and field of view. One or more exterior sensors 310 may have adjustable field of views and/or adjustable zooms.

In some embodiments, the exterior sensors 310 may operate continually during operation of the AV. In an example embodiment, the exterior sensors 310 capture sensor data (e.g., images, etc.) of a scene in which the AV drives. In other embodiment, the exterior sensors 310 may operate in accordance with an instruction from the onboard computer 150 or an external system, such as the vehicle manager 260 of the fleet management system 120. For instance, the onboard computer 150 or external system may request the exterior sensors 310 to detect TTR lane closure zones and to generate sensor data that can be used for modeling the TTR lane closure zones. Some of all of the exterior sensors 310 may capture sensor data of one or more objects in an environment surrounding the AV based on the instruction.

The LIDAR sensor 320 may measure distances to objects in the vicinity of the AV using reflected laser light. The LIDAR sensor 320 may be a scanning LIDAR that provides a point cloud of the region scanned. The LIDAR sensor 320 may have a fixed field of view or a dynamically configurable field of view. The LIDAR sensor 320 may produce a point cloud that describes, among other things, distances to various objects in the environment of the AV.

The RADAR sensor 330 may measure ranges and speeds of objects in the vicinity of the AV using reflected radio waves. The RADAR sensor 330 may be implemented using a scanning RADAR with a fixed field of view or a dynamically configurable field of view. The RADAR sensor 330 may include one or more articulating RADAR sensors, long-range RADAR sensors, short-range RADAR sensors, or some combination thereof.

The interior sensors 340 may detect the interior of the AV, such as objects inside the AV. Example objects inside the AV include passengers, client devices of passengers, components of the AV, items delivered by the AV, items facilitating services provided by the AV, and so on. The interior sensors 340 may include multiple interior cameras to capture different views, e.g., to capture views of an object inside the AV. The interior sensors 340 may be implemented with a fixed mounting and fixed field of view, or the interior sensors 340 may have adjustable field of views and/or adjustable zooms, e.g., to focus on one or more interior features of the AV. The interior sensors 340 may transmit sensor data to a perception module (such as the perception module 430 described below in conjunction with FIG. 4), which can use the sensor data to classify a feature and/or to determine a status of a feature.

In some embodiments, the interior sensors 340 include one or more input sensors that allow passengers to provide input. For instance, a passenger may use an input sensor to provide feedback on AV behaviors during the ride. The input sensors may include touch screen, microphone, keyboard, mouse, or other types of input devices. In an example, the interior sensors 340 include a touch screen that is controlled by the onboard computer 150. The onboard computer 150 may present messages on the touch screen and receive interaction of the passenger with the messages through the touch screen. A message may include information of one or more undesirable AV behaviors in the ride. In some embodiments, some or all of the interior sensors 340 may operate continually during operation of the AV. In other embodiment, some or all of the interior sensors 340 may operate in accordance with an instruction from the onboard computer 150 or an external system, such as the fleet management system 120.

Example Onboard Computer

Figure 4:
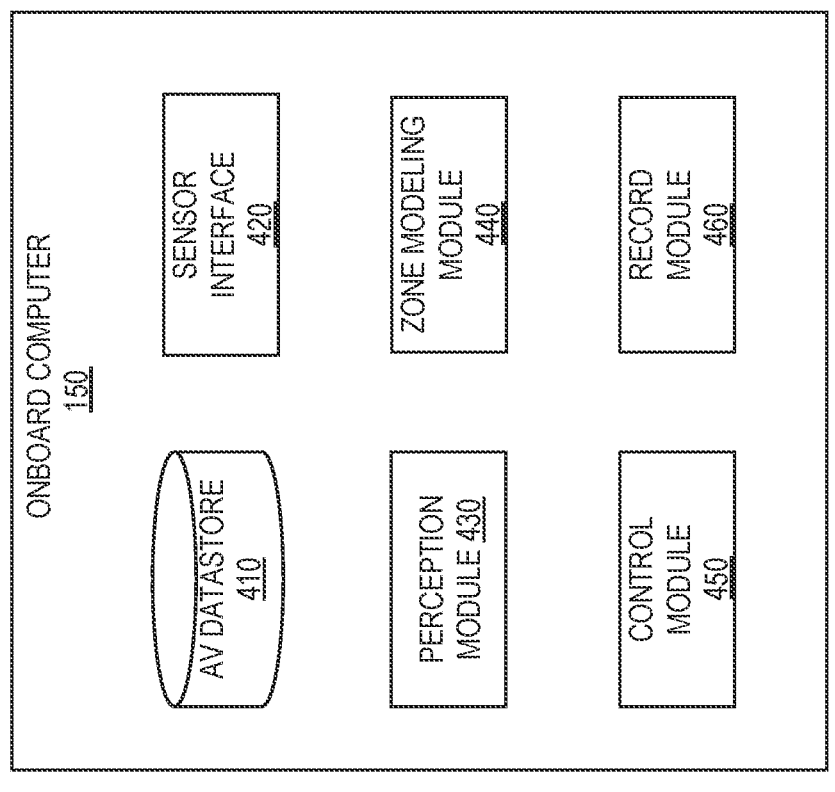
FIG. 4 is a block diagram showing an onboard computer, according to some embodiments of the present disclosure.

FIG. 4 is a block diagram showing the onboard computer 150 according to some embodiments of the present disclosure. The onboard computer 150 may control an AV, e.g., AV 110 in FIG. 1. As shown in FIG. 4, the onboard computer 150 includes an AV datastore 410, a sensor interface 420, a perception module 430, a zone modeling module 440, a control module 450, and a record module 460. In alternative configurations, fewer, different and/or additional components may be included in the onboard computer 150. For example, components and modules for conducting route planning, controlling movements of the AV, and other vehicle functions are not shown in FIG. 4. Further, functionality attributed to one component of the onboard computer 150 may be accomplished by a different component included in the onboard computer 150 or a different system, such as the fleet management system 120.

The AV datastore 410 stores data associated with operations of the AV. The AV datastore 410 may store one or more operation records of the AV. An operation record is a record of an operation of the AV, e.g., an operation for providing a ride service. The operation may be a currently performed operation or a previously performed operation ("previous operation" or "historical operation"). The operation record may include information indicating operational behaviors of the AV during the operation. The operational behaviors may include sensor detection, movement, stop, battery charging, calibration, maintenance, communication with the fleet management system 120, communication with assistance agent, communication with user, communication with another AV, and so on. The operations record may also include data used, received, or captured by the AV during the operation, such as map data, instructions from the fleet management system 120, sensor data captured by the AV's sensor suite, and so on. In some embodiments, the AV datastore 410 stores a detailed map that includes a current environment of the AV. The AV datastore 410 may store data in the map datastore 250. In some embodiments, the AV datastore 410 stores a subset of the map datastore 250, e.g., map data for a city or region in which the AV is located.

The data in the AV datastore 410 may include data generated by the AV itself. The data may include sensor data capturing one or more environments where the AV operates, e.g., operates to provide services. The sensor data may be from the sensor suite 140 of the AV. The data in the AV datastore 410 may also include perception data that identifies one or more environmental conditions. The perfection data may be from the perception module 430 of the onboard computer 150 of the AV. The data may also include external data, e.g., data from other AVs or systems. For example, the data in the AV datastore 410 may include data (e.g., sensor data, perception, etc.) from one or more other AVs that capture one or more environments where the other AVs operate. As another example, the data in the AV datastore 410 may include data from the fleet management system 120, e.g., data about environmental conditions, instructions (e.g., operational plans) from the vehicle manager 260, etc. In yet another example, the data in the AV datastore 410 may include data from one or more third-party systems that provide information of environments where the AV operates. The AV may be in communication with the one or more third-party systems, e.g., through a network.

The sensor interface 420 interfaces with the sensors in the sensor suite 140. The sensor interface 420 may request data from the sensor suite 140, e.g., by requesting that a sensor capture data in a particular direction or at a particular time. For example, the sensor interface 420 instructs the sensor suite 140 to capture sensor data of an environment surrounding the AV, e.g., by sending a request for sensor data to the sensor suite 140. In some embodiments, the request for sensor data may specify which sensor(s) in the sensor suite 140 to provide the sensor data, and the sensor interface 420 may request the sensor(s) to capture data. The request may further provide one or more settings of a sensor, such as orientation, resolution, accuracy, focal length, and so on. The sensor interface 420 can request the sensor to capture data in accordance with the one or more settings.

A request for sensor data may be a request for real-time sensor data, and the sensor interface 420 can instruct the sensor suite 140 to immediately capture the sensor data and to immediately send the sensor data to the sensor interface 420. The sensor interface 420 is configured to receive data captured by sensors of the sensor suite 140, including data from exterior sensors mounted to the outside of the AV, and data from interior sensors mounted in the passenger compartment of the AV. The sensor interface 420 may have subcomponents for interfacing with individual sensors or groups of sensors of the sensor suite 140, such as a camera interface, a LIDAR interface, a RADAR interface, a microphone interface, etc.

The perception module 430 identifies objects and/or other features captured by the sensors of the AV. The perception module 430 may identify objects inside the AV based on sensor data captured by one or more interior sensors (e.g., the interior sensors 340). For instance, the perception module 430 may identify one or more passengers in the AV. In some embodiments, the perception module 430 identifies objects in the environment of the AV and captured by one or more sensors (e.g., the exterior sensors 310, LIDAR sensor 320, RADAR sensor 330, etc.). As another example, the perception module 430 determines one or more environmental conditions based on sensor data from one or more sensors (e.g., the exterior sensors 310, LIDAR sensor 320, RADAR sensor 330, etc.).

The perception module 430 may include one or more classifiers trained using machine learning to identify particular objects. For example, a multi-class classifier may be used to classify each object in the AV or in the environment of the AV as one of a set of potential objects, e.g., a passenger, a vehicle, a pedestrian, or a cyclist. As another example, a passenger classifier recognizes passengers in the AV, a pedestrian classifier recognizes pedestrians in the environment of the AV, a vehicle classifier recognizes vehicles in the environment of the AV, etc. The perception module 430 may identify facial expressions of people, such as passengers, e.g., based on data from interior cameras. The perception module 430 may identify travel speeds of identified objects based on data from the RADAR sensor 330, e.g., speeds at which other vehicles, pedestrians, or birds are traveling. As another example, the perception module 43—may identify distances to identified objects based on data (e.g., a captured point cloud) from the LIDAR sensor 320, e.g., a distance to a particular vehicle, building, or other feature identified by the perception module 430. The perception module 430 may also identify other features or characteristics of objects in the environment of the AV based on image data or other sensor data, e.g., colors (e.g., the colors of holiday-themed lights), sizes (e.g., heights of people or buildings in the environment), makes and models of vehicles, pictures and/or words on billboards, etc.

In some embodiments, the perception module 430 fuses data from one or more interior sensors 340 with data from exterior sensors (e.g., exterior sensors 310) and/or AV datastore 410 to identify environmental objects that one or more users are looking at. The perception module 430 determines, based on an image of a user, a direction in which the user is looking, e.g., a vector extending from the user and out of the AV in a particular direction. The perception module 430 compares this vector to data describing features in the environment of the AV, including the features' relative location to the AV (e.g., based on real-time data from exterior sensors and/or the AV's real-time location) to identify a feature in the environment that the user is looking at.

While a single perception module 430 is shown in FIG. 4, in some embodiments, the onboard computer 150 may have multiple perception modules, e.g., different perception modules for performing different ones of the perception tasks described above (e.g., object perception, speed perception, distance perception, feature perception, facial recognition, mood determination, sound analysis, gaze determination, etc.).

The zone modeling module 440 uses neural networks to model lane closure zones that AVs need to drive through. The zone modeling module 440 may obtain information of a lane closure zone and generate an input dataset that can be input into a neural network. The input dataset can include one or more maps of the lane closure zone, detected objects from the AV sensor suite, and other information about the lane closure zone. A map of the lane closure zone can show static elements such as lanes, crosswalks, traffic lights, trees, fire hydrants, and signs. Information about detected objects from the AV sensor suite can include features representing objects in the lane closure zone, such as traffic lanes, regions, vehicles, EMVs, persons, new and/or temporary signs, traffic cones, and so on. The information from the AV sensor suite can also include data associated with the features, such as classification, shape, size, orientation, location, material, or other attributes of the objects represented by the features.

The zone modeling module 440 may generate the input dataset based on data from the AV datastore 410, sensor interface 420, perception module 430, fleet management system 120, one or more other AVs, other systems or devices, or some combination thereof. The zone modeling module 440 may deploy a neural network to model the restricted traffic zone based on the input dataset. The zone modeling module 440 can classify the objects for TTR attributes, where TTR attributes are object attributes that indicate the object is indicative of a traffic restriction such as a lane closure. The zone modeling module 440 can also perform lane state classification, which can include classifying lane states by associating detected objects with map elements such as lanes, roads, etc. The zone modeling module 440 can also perform polygon generation, which can include generating a polygonal representation based on objects and lane geometry. The neural network receives the input dataset and outputs one or more models of the lane closure zone. For instance, the neural network may output one or more edges and/or polygons associated with the lane closure zone. An edge associated with the lane closure zone may be an edge of the lane closure zone, indicating the lane that is closed.

The zone modeling module 440 can use the output(s) of the neural network to control the AV to drive through or pass the lane closure zone. The zone modeling module 440 may provide the output(s) of the neural network to the control module 450 for the control module 450 to plan and control the driving of the AV surrounding or in the lane closure zone.

The control module 450 controls operations of the AV, e.g., based on information from the sensor interface 420 or the perception module 430. In some embodiments, the control module 450 controls operation of the AV by using a trained model, such as a trained neural network. The control module 450 may provide input data to the control model, and the control model outputs operation parameters for the AV. The input data may include models of restricted traffic zones from the zone modeling module 440, sensor data from the sensor interface 420 (which may indicate a current state of the AV), objects identified by the perception module 430, data from the fleet management system, other data, or some combination thereof. The operation parameters are parameters indicating operation to be performed by the AV. The operation of the AV may include perception, prediction, planning, localization, motion, navigation, other types of operation, or some combination thereof.

The control module 450 may provide instructions to various components of the AV based on the output of the control model, and these components of the AV will operate in accordance with the instructions. In an example where the output of the control model indicates that a change of traveling speed of the AV is required given a prediction of traffic condition, the control module 450 may instruct the motor of the AV to change the traveling speed of the AV. In another example where the output of the control model indicates a need to detect characteristics of an object in the environment around the AV (e.g., detect a speed limit), the control module 450 may instruct the sensor suite 140 to capture an image of the speed limit sign with sufficient resolution to read the speed limit and instruct the perception module 430 to identify the speed limit in the image.

The record module 460 generates operation records of the AV and stores the operations records in the AV datastore 410. The record module 460 may generate an operation record in accordance with an instruction from the fleet management system 120, e.g., the vehicle manager 260. The instruction may specify data to be included in the operation record. The record module 460 may determine one or more timestamps for an operation record. In an example of an operation record for a ride service, the record module 460 may generate timestamps indicating the time when the ride service starts, the time when the ride service ends, times of specific AV behaviors associated with the ride service, and so on. The record module 460 can transmit the operation record to the fleet management system 120.

Example Lane Closure Zone Identification

Figures 5A, 5B:
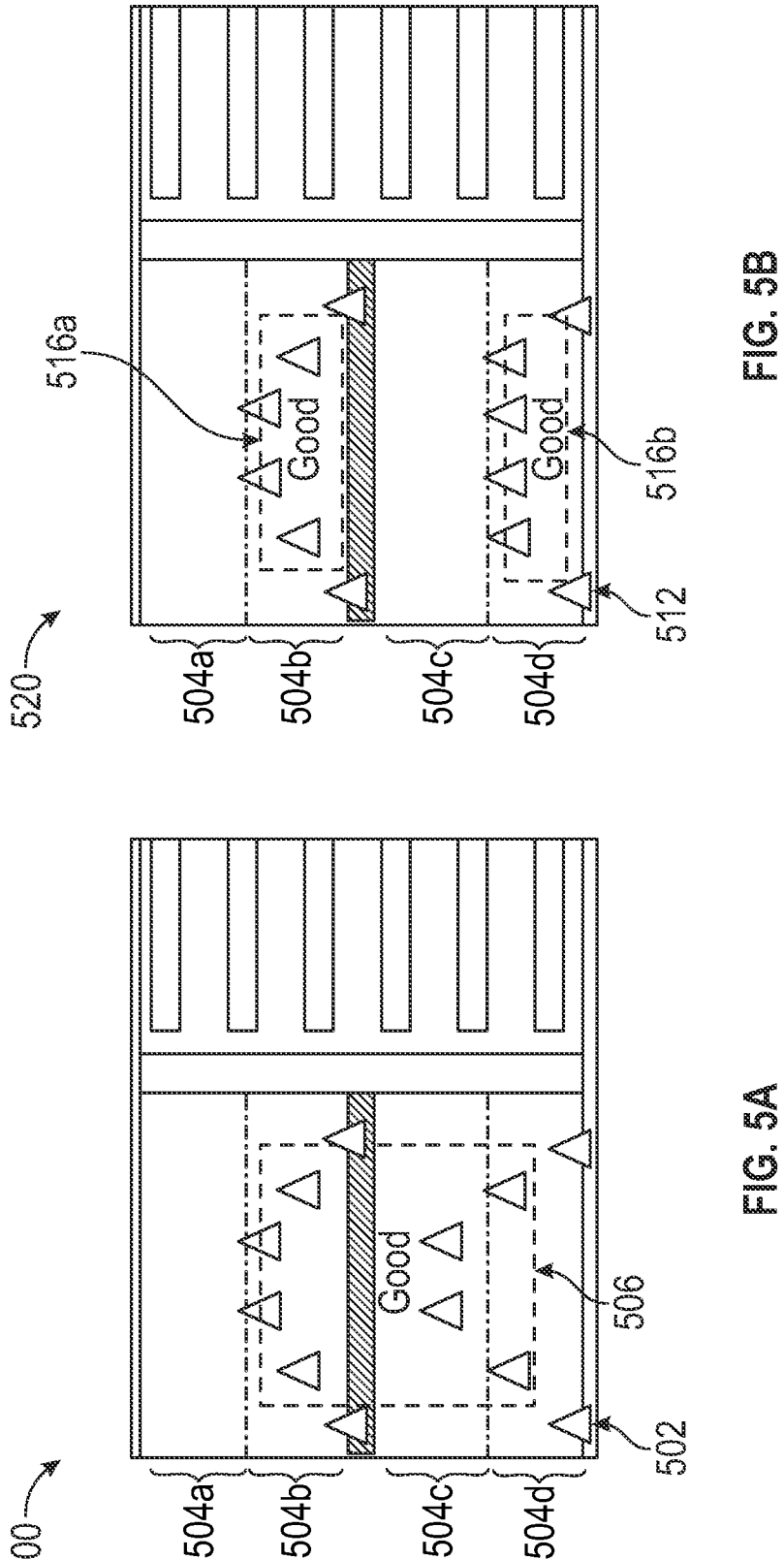
FIGS. 5A and 5B are diagrams showing examples of lane closure zone modeling, according to some examples of the present disclosure.

FIGS. 5A and 5B are diagrams 500, 520 showing examples of lane closure zone modeling, according to some examples of the present disclosure. In various examples, a lane closure zone identification module receives as input identified lane closure objects 502. In particular, a vehicle identifies lane closure objects in its field of view and on a mapped roadway, and the locations of each of the identified lane closure objects 502 are input to the lane closure identification module. In various examples, all classes of objects are included in the input, and non-player characters (NPCs) can also be input to the lane closure identification module. In some examples, the objects are identified by a vehicle tracker having motion estimation and temporal fusion.

In various examples, a lane closure zone can include any area with lane closure objects on the road. Lane closure objects can include construction objects, temporary signs, emergency vehicles, caution tape, flares, warning lights, reflectors, and other objects blocking a lane. In some examples, construction objects can include traffic cones, construction drums, traffic barrels, tubular construction markers, vertical panels, and traffic barriers. The lane closure zone objects 502 can be identified by a vehicle driving on the roadway, and input to a lane closure identification module. The road section shown in FIG. 5A includes four lanes of traffic: first traffic lane 504a, second traffic lane 504b, third traffic lane 504c, and fourth traffic lane 504d. As shown in FIG. 5A, the lane closure zone includes lane closure objects 502 positioned in the second 504b, third 504c, and fourth 504d traffic lanes. In some examples, the lane closure identification module generates a predicted lane closure polygon based on the lane closure objects 502. The lane closure identification module obtains map data for the roadway and identifies the first 504a, second 504b, third 504c, and fourth 504d traffic lanes. Based on the predicted lane closure polygon and the map data, the lane closure identification module identifies the traffic lanes covered at least in part by the predicted lane closure polygon (the second 504b, third 504c, and fourth 504d traffic lanes), and marks the entire lanes as closed.

In some examples, the lane closure polygon 506 is a manually labeled polygon based on data from a set of frames in a segment (as opposed to labeling polygons frame-by-frame, individually in each frame). Based on the polygon 506 and map data, the traffic lanes 504b, 504c, 504d covered at least in part by the lane closure polygon 506 can be identified and marked as ground truth closed lanes. In some examples, the lane closure identification module can identify and mark the traffic lanes 504b, 504c, 504d covered at least in part by the lane closure polygon 506. The ground truth lane closure then can be applied to each frame of the set of frames, such that ground truth lane closure is applied to every frame. Similarly, the lane closure objects 502 can be labeled one time, based on data from the set of frames in a segment. Since the lane closure objects are static (non-moving), the single set of labeled lane closure objects 502 can be applied across the frames in the segment. Thus, the labeled lane closure objects 502 can be applied to each frame of the set of frames, such that one labeled set of lane closure objects 502 is applied to every frame. In various examples, in certain frames, and from certain vantage points, vehicle sensors only have visibility of a subset of the lane closure objects 502, and do not have visibility of one or more of the lane closure objects 502. Similarly, in certain frames, based on the vehicle vantage point, vehicle sensors have visibility of only partial lane closure regions. In various examples, the ground truth lane closure data can be compared to predicted lane closure data to evaluate the performance of the lane closure identification module.

The generated lane closure polygon should include all lanes that are closed off by various road closure objects. If a lane is closed, and the road closure polygon does not cover any part of the lane, the polygon is incorrect. Similarly, if a lane should not be closed but the road closure polygon extends into the lane, the polygon is incorrect.

The road section shown in FIG. 5B also includes four lanes of traffic: first traffic lane 504a, second traffic lane 504b, third traffic lane 504c, and fourth traffic lane 504d. As shown in FIG. 5B, the lane closure zone includes lane closure objects 512 positioned in the second 504b and fourth 504d traffic lanes. In some examples, the lane closure identification module generates two predicted lane closure polygons 516a, 516b based on the lane closure objects 512. The lane closure identification module obtains map data for the roadway and identifies the first 504a, second 504b, third 504c, and fourth 504d traffic lanes. In some examples, based on the predicted lane closure polygons 516a, 516b and the map data, the lane closure identification module identifies the traffic lanes covered at least in part by the predicted lane closure polygons (the second 504b and fourth 504d traffic lanes), and marks the entire lanes as closed. In some examples, the lane closure polygons 516a, 516b are manually labeled polygons, labeled based on data from a set of frames in a segment (as opposed to labeling polygons frame-by-frame, individually in each frame).

As described above with respect to FIG. 5A, based on the polygons 516a, 516b and map data, the traffic lanes covered at least in part by the lane closure polygons 516a, 516b are identified and marked as ground truth closed lanes. In some examples, the lane closure identification module can identify and mark the traffic lanes 504b, 504d covered at least in part by the lane closure polygons 516a, 516b. The ground truth lane closure can then be applied to each frame of the set of frames, such that ground truth lane closure is applied to every frame. Similarly, the lane closure objects 512 can be labeled one time, based on data from the set of frames in a segment. Since the lane closure objects are static (non-moving), the single set of labeled lane closure objects 512 can be applied across the frames in the segment. Thus, the labeled lane closure objects 512 can be applied to each frame of the set of frames, such that one labeled set of lane closure objects 512 is applied to every frame. In various examples, in certain frames, and from certain vantage points, vehicle sensors only have visibility of a subset of the lane closure objects 512, and do not have visibility of one or more of the lane closure objects 512. Similarly, in certain frames, based on the vehicle vantage point, vehicle sensors have visibility of only partial lane closure regions. In various examples, the ground truth lane closure data can be compared to predicted lane closure data to evaluate the performance of the lane closure identification module.

Figures 6A, 6B:
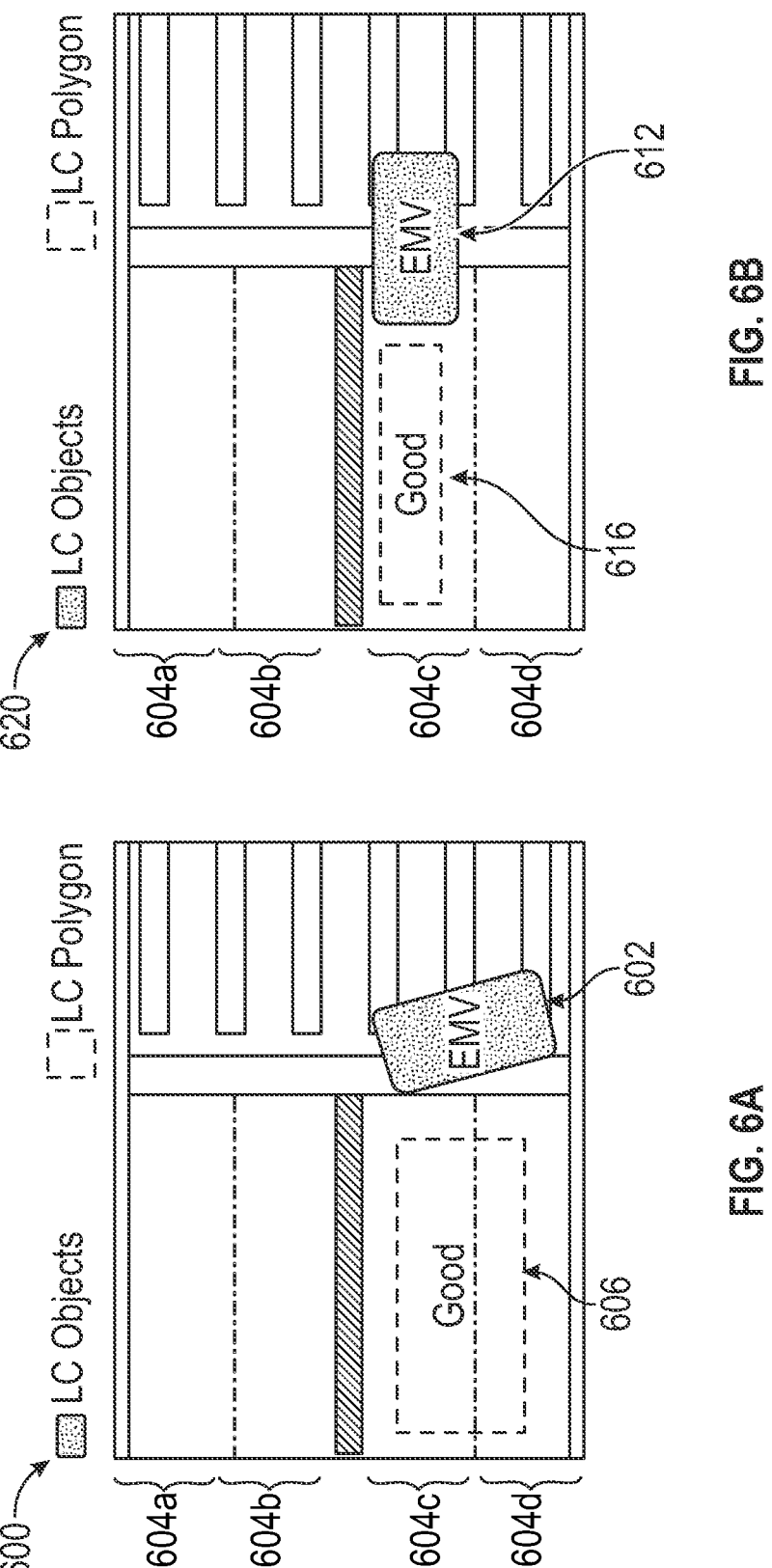
FIGS. 6A and 6B are diagrams showing examples of lane closure zone modeling, according to some examples of the present disclosure.

FIGS. 6A and 6B are diagrams 600 showing examples of lane closure zone modeling, according to some examples of the present disclosure. In various examples, a lane closure zone identification module receives as input the identified lane closure objects 602, where the lane closure object 602 is an emergency vehicle such as a police vehicle, emergency medical vehicle, and/or emergency fire vehicle. In particular, an autonomous vehicle identifies the lane closure object 602 in its field of view and on a mapped roadway, and the location of the identified lane closure object 602 is input to the lane closure identification module. When the lane closure object 602 is an emergency vehicle, the vehicle identifying the lane closure object 602 can include a perception system to determine that the emergency vehicle indicates a lane closure and to determine that the emergency vehicle is not simply driving on the roadway. In various examples, in addition to the emergency vehicle (i.e., lane closure object 602), other classes of objects are also included in the input, and non-player characters (NPCs) can also be input to the lane closure identification module. In some examples, the objects are identified by a vehicle tracker having motion estimation and temporal fusion.

The road section shown in FIG. 6A includes four lanes of traffic: first traffic lane 604a, second traffic lane 604b, third traffic lane 604c, and fourth traffic lane 604d. As shown in FIG. 6A, the lane closure zone is closed off by a lane closure object 602 positioned in front of the third 604c and fourth 604d traffic lanes, effectively blocking the third 604c and fourth 604d lanes. The lane closure identification module obtains map data for the roadway and identifies the first 604a, second 604b, third 604c, and fourth 604d traffic lanes. In some examples, the lane closure identification module generates a predicted lane closure polygon 606 based on the detected lane closure object 602. Based on the predicted lane closure polygon and the map data, the lane closure identification module identifies the traffic lanes covered at least in part by the predicted lane closure polygon 606 (the third 604c and fourth 604d traffic lanes), and marks the entire lanes as closed, as described in greater detail with respect to FIG. 7.

In some examples, the lane closure polygon 606 is a manually labeled polygon based on data from a set of frames in a segment. Based on the polygon 606 and map data, the traffic lanes 604c, 604d covered at least in part by the lane closure polygon 606 are identified and marked as ground truth closed lanes. In some examples, the lane closure identification module can identify and mark the traffic lanes 604c, 604d covered at least in part by the lane closure polygon 606. The ground truth lane closure can then be applied to each frame of the set of frames, such that ground truth lane closure is applied to every frame. Similarly, the lane closure object 602 can be labeled one time, based on data from the set of frames in a segment. Since the lane closure object is static (non-moving) over the segment of data, the single labeled lane closure object 602 can be applied across the frames in the segment. Thus, the labeled lane closure object 602 can be applied to each frame of the set of frames, such that the labeled lane closure object 602 is applied to every frame. In various examples, in certain frames, and from certain vantage points, vehicle sensors only have partial visibility of the lane closure object 602. Similarly, in certain frames, based on the vehicle vantage point, vehicle sensors have visibility of only partial lane closure regions. In various examples, the ground truth lane closure data can be compared to predicted lane closure data to evaluate the performance of the lane closure identification module.

FIG. 6B also shows a road section including four lanes of traffic: first traffic lane 604a, second traffic lane 604b, third traffic lane 604c, and fourth traffic lane 604d. As shown in FIG. 6B, the lane closure zone is closed off by a lane closure object 612 positioned in front of the third 604c traffic lanes, effectively blocking the third 604c lane. The lane closure object 612 can be an emergency vehicle. In various examples, the lane closure identification module determines that the emergency vehicle stopped in front of the third traffic lane 604c is closing the third traffic lane 604c (as opposed to simply driving in the third traffic lane 604c). In some examples, the lane closure identification module generates a predicted lane closure polygon 616 based on the detected lane closure object 612. Based on the predicted lane closure polygon and the map data, the lane closure identification module identifies the traffic lanes covered at least in part by the predicted lane closure polygon (the third 604c traffic lanes), and marks the entire lane as closed, as described in greater detail with respect to FIGS. 7A and 7B. In some examples, the lane closure polygon 616 is a manually labeled polygon based on data from a set of frames in a segment. Based on the polygon 606 and map data, the traffic lanes 604c, 604d covered at least in part by the lane closure polygon 606 are identified and marked as ground truth closed lanes, as described above with respect to FIG. 6A.

Figure 7A:
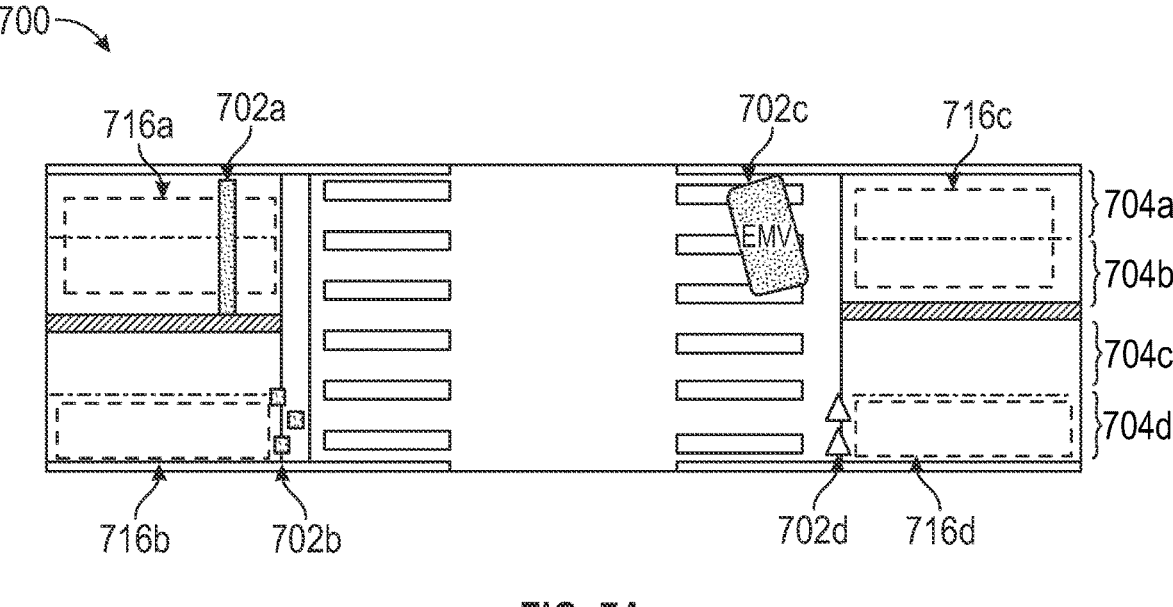
FIGS. 7A and 7B are diagrams showing an example of lane closure zone modeling including perception metrics, according to some examples of the present disclosure.
Figure 7B:
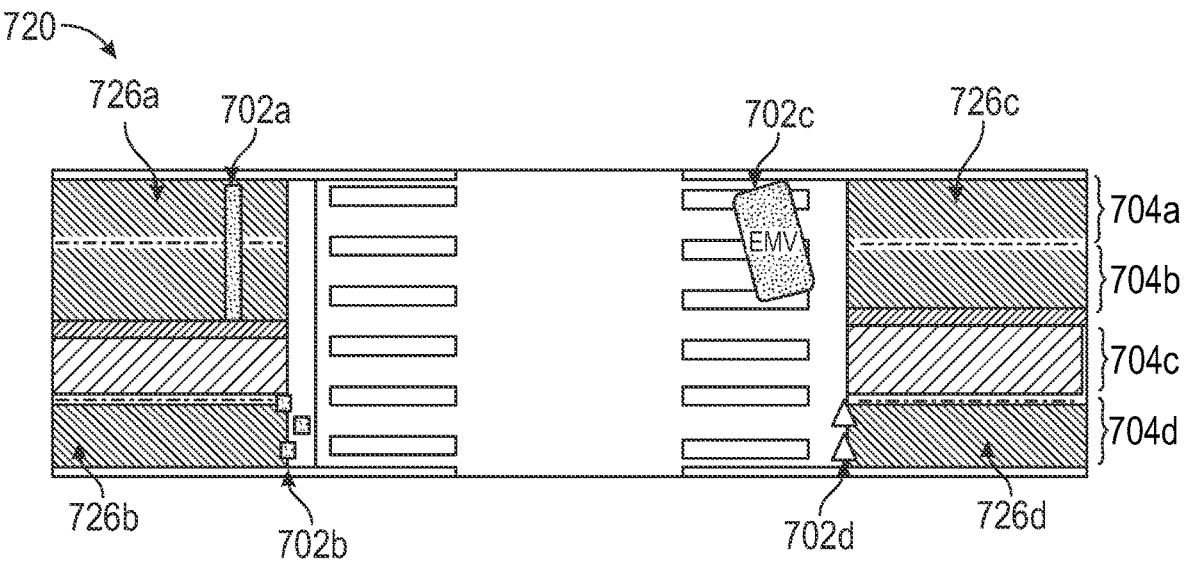

FIGS. 7A and 7B are diagrams 700, 720 showing an example of lane closure zone modeling including perception metrics, according to some examples of the present disclosure. FIGS. 7A and 7B show four traffic lanes: first traffic lane 704a, second traffic lane 704b, third traffic lane 704c, and fourth traffic lane 704d. Various road closure objects 702a, 702b, 702c, 702d close various parts of the first 704a, second 704b, and fourth 704d traffic lanes. FIG. 7A shows first 716a, second 716b, third 716c, and fourth 716d polygons generated to indicate lane closure zones, as described above with respect to FIGS. 5A, 5B, 6A, and 6B.

The first 716a, second 716b, third 716c, and fourth 716d polygons are post-processed using perception-level metrics to generate lane states. Lane states include a lane open state and a lane closed state. The first 716a, second 716b, third 716c, and fourth 716d polygons are evaluated in conjunction with map data for the first 704a, second 704b, third 704c, and fourth 704d traffic lanes. Based on the positions of the first 716a, second 716b, third 716c, and fourth 716d polygons, the perception-level metrics determine that the first polygon 716a closes the first 704a and second 704b lanes in the region 726a, the second polygon 716b closes the fourth lane 704d in the region 726b, the third polygon 716c closes the first 704a and second 704b lanes in the region 726c, and the fourth polygon 716d closes off the fourth lane 704d in the region 726d. Thus, the regions 726a, 726b, 726c, and 726d of the first 704a, second 704b, and fourth 704d lanes are marked as closed such that vehicles will not drive in these areas of the first 704a, second 704b, and fourth 704d lanes.

Example Method of Lane Closure Zone Identification

FIG. 8 is a flowchart showing a method 800 for lane closure zone identification, according to some examples of the present disclosure. In some examples, the method 800 can be used to train a neural network to identify lane closures and lane closure zones. At step 802, map data for an area around a lane closure is obtained. The map data can include 3D map data, and it can include map datastore data, as well as semantic map data and vector map data. At step 804, a labeled polygon indicating a lane closure zone is received. The labeled polygon is received by a lane closure identification module. The polygon can be a manually labeled polygon indicating a closed area in a lane closure zone. At step 806, a ground truth lane state for the lane closure zone is generated based on the labeled polygon. In some examples, using the map data and the labeled polygon, any lane in the map data that is at least partially covered by the polygon is labeled as closed in beginning at the lane closure object. In various examples, the lane closure identification module converts the labeled polygon to a lane state for the one or more lanes at least partially covered by the polygon.

At step 808, a set of captured data frames of the lane closure zone is received by the lane closure identification module. The captured data frames can include data captured by a vehicle sensor suite, such as the sensor suite 140 described herein. The captured data can include image data, LIDAR data, RADAR data, and any other data captured by the vehicle sensor suite. In various examples, the data is captured when the vehicle drives within a selected distance of the lane closure zone, and one or more lane closure objects are detectable by vehicle sensors. At step 810, one or more lane closure objects in the one or more captured data frames are identified. As described above, the lane closure objects can include temporary signs, emergency vehicles, caution tape, traffic cones, construction drums, traffic barrels, tubular construction markers, vertical panels, traffic barriers, flares, warning lights, reflectors, and other objects blocking a lane or otherwise indicating a lane closure. Additionally, in various implementations, other objects in the one or more captured data frames are identified, including non-construction zone objects such as signs, fire hydrants, trees, people, other vehicles, etc.

At step 812, a predicted lane closure polygon is generated based on the one or more lane closure objects and the map data. Based on the predicted lane closure polygon, at step 814, a predicted lane state for the lane closure zone is generated. In various examples, each lane within the lane closure zone can be marked as open or closed. Additionally, in various examples, selected regions of each lane within the lane closure zone can be marked as open or closed based on the predicted lane closure polygon.

At step 816, the difference between the ground truth lane state and the predicted lane state is determined. In some examples, the difference is based on the area of overlap of the ground truth lane state and the predicted lane state, with larger non-overlapping regions indicating a larger difference. At step 818, a performance metric for the lane closure identification module is generated based on the difference determined at step 816. In various examples, various different factors can be used for generation of the performance metric. In some examples, the factors can include a difference between a ground truth lane closure area and a corresponding predicted lane closure area. In some examples, a lane that is included in a ground truth lane closure and is not included in the predicted lane closure can have a greater negative effect on the performance metric than a differing size of a ground truth lane closure area and a predicted lane closure area. In some examples, the performance metric is generated by determining an intersection over union (IoU) value.

Example Processing System

Figure 9:
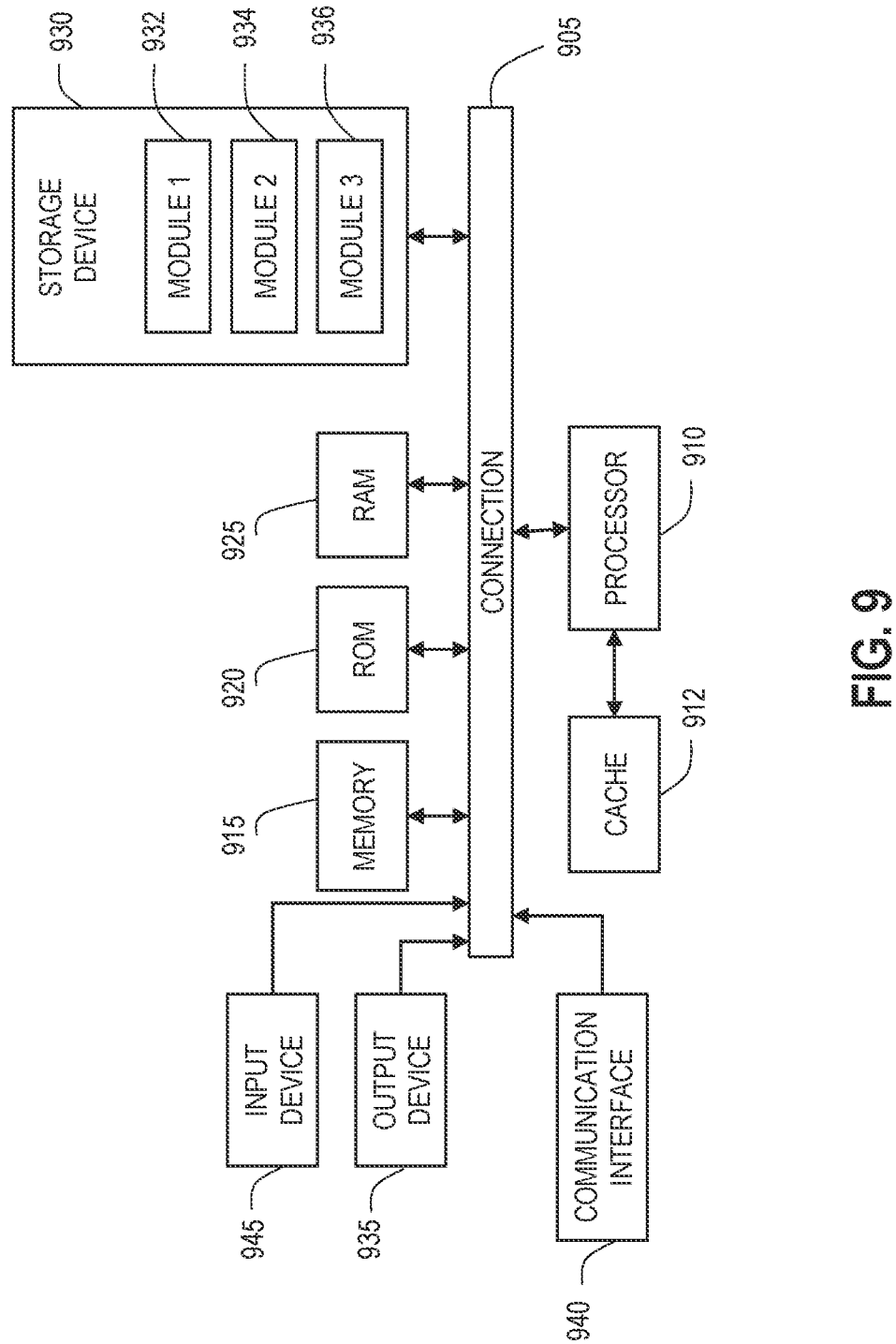
FIG. 9 illustrates an example processor-based system with which some aspects of the subject technology can be implemented.

FIG. 9 illustrates an example processor-based system 900 with which some aspects of the subject technology can be implemented. In some examples, the processor-bases system 900 can be a central computer that can receive information from and transmit information to an onboard computer on a vehicle. In some examples, the processor-based system 900 can be any computing device making up, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection. In various examples, an active tunable filter as discussed herein can be added to any of the components to filter harmonics and/or noise from transmitted signals.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (Central Processing Unit (CPU) or processor) 910 and connection 905 that couples various system components including system memory 915, such as Read-Only Memory (ROM) 920 and Random-Access Memory (RAM) 925 to processor 910. Computing system 900 can include a cache of high-speed memory 912 connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLO- NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Program-mable ROM (PROM), Erasable PROM (EPROM), Electri-cally Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 930 can include software services, servers, services, etc., that when the code that defines such software is executed by the processor 910, it causes the system 900 to perform a function. In some embodiments, a hardware service that performs a particular function can include the software component stored in a computer-readable medium in connection with the necessary hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the func-tional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another commu-nications connection (either hardwired, wireless, or combi-nation thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose com-puter, special purpose computer, or special purpose process-ing device to perform a certain function or group of func-tions. Computer-executable instructions also include program modules that are executed by computers in stand-alone or network environments. Generally, program mod-ules include routines, programs, components, data struc-tures, objects, and the functions inherent in the design of special-purpose processors, etc. that perform tasks or imple-ment abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of com-puter system configurations, including personal computers, hand-held devices, multi-processor systems, microproces-sor-based or programmable consumer electronics, network Personal Computers (PCs), minicomputers, mainframe com-puters, and the like. Embodiments may also be practiced in distributed computing environments where tasks are per-formed by local and remote processing devices that are linked (either by hardwired links, wireless links, or by a combination thereof) through a communications network. In a distributed computing environment, program modules may be located in both local and remote memory storage devices.

Example of an Autonomous Vehicle Fleet

Figure 10:
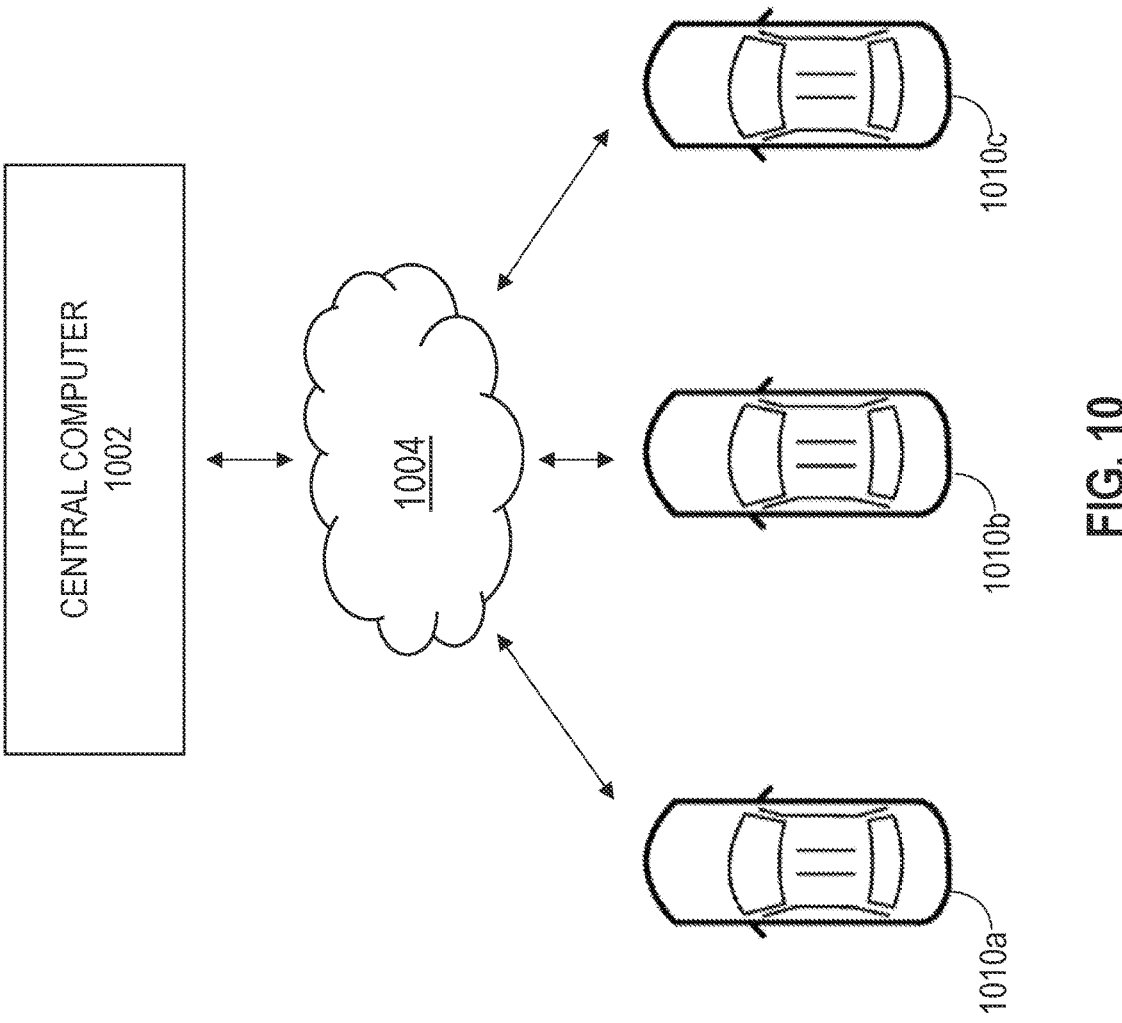
FIG. 10 is a diagram illustrating a fleet of autonomous vehicles in communication with a central computer.

FIG. 10 is a diagram 1000 illustrating a fleet of autono-mous vehicles 1010a, 1010b, 1010c in communication with a central computer 1002, according to some embodiments of the disclosure. The vehicles 1010a-1010c communicate wirelessly with a cloud 1004 and a central computer 1002. The central computer 1002 includes a routing coordinator, a dispatch service, and a database of information from the vehicles 1010a-1010c in the fleet. In some examples, the database of information can include sensor data including captured data frames. In some examples, the database of information can include a state of charge of each vehicle as well as other vehicle conditions and information. Autono-mous vehicle fleet routing refers to the routing of multiple vehicles in a fleet.

Each vehicle 1010a-1010c includes an onboard computer that communicates with the central computer 1002. In some examples, the onboard computer can transmit sensor data, including a set of captured data frames and generated predicted lane states, to the central computer 1002. Each vehicle 1010a-1010c in the fleet of vehicles communicates with a routing coordinator. Thus, information gathered by various autonomous vehicles 1010a-1010c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and pro-cesses position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, the routing coordinator uses collected position data corresponding to emergency events to generate a best route for an autonomous vehicle to avoid a potential emer-gency situation and associated unknowns. In some examples, the routing coordinator generates a route for a vehicle to the facility 1030. In some examples, a vehicle 1010*a*-1010*c* has one or more scheduled stops before embarking on its route to the facility 1030.

SELECT EXAMPLES

Example 1 provides a method for lane closure zone detection, comprising: obtaining map data for an area around a lane closure zone, wherein the map data includes travel lane information; receiving a labeled polygon indicating the lane closure zone; generating a ground truth lane state for the lane closure zone based on the labeled polygon; receiving a set of captured data frames of the lane closure zone; identifying at least one lane closure object in each of the set of captured data frames; generating a predicted lane closure polygon for the lane closure zone based on the at least one lane closure object and the travel lane information; generating a predicted lane state for the lane closure zone based on the predicted lane closure polygon; determining a difference between the ground truth lane state and the predicted lane state; and generating a performance metric based on the difference.

Example 2 provides a method, system, and/or vehicle of any of the preceding and/or following examples, further comprising classifying the at least one lane closure object for temporary traffic restriction attributes.

Example 3 provides a method, system, and/or vehicle of any of the preceding and/or following examples, wherein generating the predicted lane state includes identifying map elements and associating the predicted lane closure polygon and the at least one lane closure object with the map elements.

Example 4 provides a method, system, a non-transitory computer-readable media, and/or vehicle of any of the preceding and/or following examples, wherein the at least one lane closure object includes a plurality of lane closure objects, and wherein generating a predicted lane closure polygon further comprises generating predicted edges of the predicted lane closure polygon based on the plurality of lane closure objects.

Example 5 provides a method, system, a non-transitory computer-readable media, and/or vehicle of any of the preceding and/or following examples, wherein receiving a set of captured data frames includes receiving, for each frame in the set of captured data frames, image data, LIDAR data, and RADAR data.

Example 6 provides a method, system, a non-transitory computer-readable media, and/or vehicle of any of the preceding and/or following examples, wherein generating the performance metric includes determining an intersection over union value.

Example 7 provides a method, system, a non-transitory computer-readable media, and/or vehicle of any of the preceding and/or following examples, wherein the ground truth lane state is a first ground truth lane state for a closed lane, wherein the predicted lane state is a first predicted lane state for the closed lane, and further comprising generating a second ground truth lane state for an open lane and generating a second predicted lane state for the open lane.

Example 8 provides a method, system, a non-transitory computer-readable media, and/or vehicle of any of the preceding and/or following examples, wherein the lane closure object is an emergency vehicle, and wherein generating the predicted lane state includes determining that the emergency vehicle is stopped and blocking a traffic lane, identifying map elements, and associating the predicted lane closure polygon and the at least one lane closure object with the map elements.

Example 9 provides one or more non-transitory computer-readable media storing instructions executable to perform operations, the operations comprising: obtaining map data for an area around a lane closure zone, wherein the map data includes travel lane information; receiving a labeled polygon indicating the lane closure zone; generating a ground truth lane state for the lane closure zone based on the labeled polygon; receiving a set of captured data frames of the lane closure zone; identifying at least one lane closure object in each of the set of captured data frames; generating a predicted lane closure polygon for the lane closure zone based on the at least one lane closure object and the travel lane information; generating a predicted lane state for the lane closure zone based on the predicted lane closure polygon; determining a difference between the ground truth lane state and the predicted lane state; and generating a performance metric based on the difference.

Example 10 provides a method, system, non-transitory computer-readable media, and/or vehicle of any of the preceding and/or following examples, wherein the instructions further comprise classifying the at least one lane closure object for temporary traffic restriction attributes.

Example 11 provides a method, system, non-transitory computer-readable media, and/or vehicle of any of the preceding and/or following examples, wherein generating the predicted lane state includes identifying map elements and associating the predicted lane closure polygon and the at least one lane closure object with the map elements.

Example 12 provides a method, system, non-transitory computer-readable media, and/or vehicle of any of the preceding and/or following examples, wherein the at least one lane closure object includes a plurality of lane closure objects, and wherein generating a predicted lane closure polygon further comprises generating predicted edges of the predicted lane closure polygon based on the plurality of lane closure objects.

Example 13 provides a method, system, non-transitory computer-readable media, and/or vehicle of any of the preceding and/or following examples, wherein receiving a set of captured data frames includes receiving, for each frame in the set of captured data frames, image data, LIDAR data, and RADAR data.

Example 14 provides a method, system, non-transitory computer-readable media, and/or vehicle of any of the preceding and/or following examples, wherein generating the performance metric includes determining an intersection over union value.

Example 15 provides a method, system, non-transitory computer-readable media, and/or vehicle of any of the preceding and/or following examples, wherein the ground truth lane state is a first ground truth lane state for a closed lane, wherein the predicted lane state is a first predicted lane state for the closed lane, and wherein the instructions further comprise generating a second ground truth lane state for an open lane and generating a second predicted lane state for the open lane.

Example 16 provides a method, system, non-transitory computer-readable media, and/or vehicle of any of the preceding and/or following examples, wherein the lane closure object is an emergency vehicle, and wherein generating the predicted lane state includes determining that the emergency vehicle is stopped and blocking a traffic lane, identifying map elements, and associating the predicted lane closure polygon and the at least one lane closure object with the map elements.

Example 17 provides computer system, comprising: a computer processor for executing computer program instructions; and one or more non-transitory computer-readable media storing computer program instructions executable by the computer processor to perform operations comprising: obtaining map data for an area around a lane closure zone, wherein the map data includes travel lane information; receiving a labeled polygon indicating the lane closure zone; generating a ground truth lane state for the lane closure zone based on the labeled polygon; receiving a set of captured data frames of the lane closure zone; identifying at least one lane closure object in each of the set of captured data frames; generating a predicted lane closure polygon for the lane closure zone based on the at least one lane closure object and the travel lane information; generating a predicted lane state for the lane closure zone based on the predicted lane closure polygon; determining a difference between the ground truth lane state and the predicted lane state; and generating a performance metric based on the difference.

Example 18 provides a method, system, non-transitory computer-readable media, and/or vehicle of any of the preceding and/or following examples, wherein the instructions further comprise classifying the at least one lane closure object for temporary traffic restriction attributes.

Example 19 provides a method, system, non-transitory computer-readable media, and/or vehicle of any of the preceding and/or following examples, wherein generating the predicted lane state includes identifying map elements and associating the predicted lane closure polygon and the at least one lane closure object with the map elements.

Example 20 provides a method, system, non-transitory computer-readable media, and/or vehicle of any of the preceding and/or following examples, wherein the ground truth lane state is a first ground truth lane state for a closed lane, wherein the predicted lane state is a first predicted lane state for the closed lane, and wherein the instructions further comprise generating a second ground truth lane state for an open lane and generating a second predicted lane state for the open lane.

Example 21 provides an autonomous vehicle for lane closure zone detection, comprising: an onboard computer configured to obtain map data for an area around a lane closure zone, wherein the map data includes travel lane information, receive a labeled polygon indicating the lane closure zone, and generate a ground truth lane state for the lane closure zone based on the labeled polygon; and a lane closure identification module configured to receive a set of captured data frames of the lane closure zone, identify at least one lane closure object in each of the set of captured data frames, generate a predicted lane closure polygon for the lane closure zone based on the at least one lane closure object and the travel lane information, and generate a predicted lane state for the lane closure zone based on the predicted lane closure polygon; wherein the onboard computer is further configured to determine a difference between the ground truth lane state and the predicted lane state, and generate a performance metric based on the difference.

Example 22 provides a system for evaluating lane closure zone detection, comprising: a vehicle including: an onboard computer configured to obtain map data for an area around a lane closure zone, wherein the map data includes travel lane information, a sensor suite configured to capture sensor data including a set of captured data frames of a lane closure zone, and a perception module configured to: identify at least one lane closure object in each of the set of captured data frames, generate a predicted lane closure polygon for the lane closure zone based on the at least one lane closure object and travel lane information, and generate a predicted lane state for the lane closure zone based on the predicted lane closure polygon, and wherein the onboard computer is further configured to transmit the set of captured data frames and the generated predicted lane states to a central computer; and the central computer configured to: obtain map data for an area around a lane closure zone, wherein the map data includes travel lane information; receive a labeled polygon indicating the lane closure zone; generate a ground truth lane state for the lane closure zone based on the labeled polygon; receive the set of captured data frames of the lane closure zone; determine a difference between the ground truth lane state and the predicted lane state; and generate a performance metric based on the difference.

Example 23 provides a method, system, non-transitory computer-readable media, and/or vehicle of any of the preceding and/or following examples, wherein the perception module is further configured to classify the at least one lane closure object for temporary traffic restriction attributes.

Example 24 provides a method, system, non-transitory computer-readable media, and/or vehicle of any of the preceding and/or following examples, wherein the perception module is configured to generate the predicted lane state by identifying map elements and associating the predicted lane closure polygon and the at least one lane closure object with the map elements.

Example 25 provides a method, system, non-transitory computer-readable media, and/or vehicle of any of the preceding and/or following examples, wherein the at least one lane closure object includes a plurality of lane closure objects, and wherein the perception module is configured to generate the predicted lane closure polygon by generating predicted edges of the predicted lane closure polygon based on the plurality of lane closure objects.

Example 26 provides a method, system, non-transitory computer-readable media, and/or vehicle of any of the preceding and/or following examples, wherein the set of captured data frames includes, for each frame in the set of captured data frames, image data, LIDAR data, and RADAR data.

Example 27 provides a method, system, non-transitory computer-readable media, and/or vehicle of any of the preceding and/or following examples, wherein the ground truth lane state is a first ground truth lane state for a closed lane, wherein the predicted lane state is a first predicted lane state for the closed lane, and wherein caption module is further configured to generate a second predicted lane state for an open lane, and wherein the central computer is further configured to generate a second ground truth lane state for the open lane.

Example 28 provides a method, system, non-transitory computer-readable media, and/or vehicle of any of the preceding and/or following examples, wherein the lane closure object is an emergency vehicle, and wherein the perception module is configured to determine that the emergency vehicle is stopped and blocking a traffic lane, identify map elements, associate the predicted lane closure polygon and the at least one lane closure object with the map elements to generate the predicted lane state.

OTHER IMPLEMENTATION NOTES,
VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method for evaluating lane closure zone detection, comprising:
    obtaining map data for an area around a lane closure zone, wherein the map data includes travel lane information;
    receiving a labeled polygon indicating the lane closure zone;
    generating a ground truth lane state for the lane closure zone based on the labeled polygon;
    receiving a set of captured data frames of the lane closure zone from a sensor suite comprising a computer vision system, localization sensors, and driving sensors;
    identifying at least one lane closure object in each of the set of captured data frames using a perception module of an onboard computer, and wherein the perception module fuses data from one or more interior sensors with data from exterior sensors;
    generating a predicted lane closure polygon for the lane closure zone based on the at least one lane closure object and the travel lane information using a zone modeling module of the onboard computer;
    generating a predicted lane state for the lane closure zone based on the predicted lane closure polygon using the zone modeling module of the onboard computer;
    determining a difference between the ground truth lane state and the predicted lane state; and
    generating a performance metric based on the difference.

2. The method of claim 1, further comprising classifying the at least one lane closure object for temporary traffic restriction attributes using the perception module of the onboard computer.

3. The method of claim 1, wherein generating the predicted lane state includes identifying map elements and associating the predicted lane closure polygon and the at least one lane closure object with the map elements.

4. The method of claim 1, wherein the at least one lane closure object includes a plurality of lane closure objects, and wherein generating a predicted lane closure polygon further comprises generating predicted edges of the predicted lane closure polygon based on the plurality of lane closure objects.

5. The method of claim 1, wherein receiving a set of captured data frames includes receiving, for each frame in the set of captured data frames, image data, LIDAR data, and RADAR data.

6. The method of claim 1, wherein generating the performance metric includes:
    determining a first intersection over union value for the labeled polygon and the lane closure zone,
    matching the labeled polygon with a first lane in the lane closure zone based on the first intersection over union value,
    determining a second intersection over union value for the predicted lane closure polygon, and
    matching the predicted lane closure polygon with the first lane in the lane closure zone based on the second intersection over union value.

7. The method of claim 1, wherein the ground truth lane state is a first ground truth lane state for a closed lane, wherein the predicted lane state is a first predicted lane state for the closed lane, and further comprising generating a second ground truth lane state for an open lane and generating a second predicted lane state for the open lane.

8. The method of claim 1, wherein the lane closure object is an emergency vehicle, and wherein generating the predicted lane state includes determining that the emergency vehicle is stopped and blocking a traffic lane, identifying map elements, and associating the predicted lane closure polygon and the at least one lane closure object with the map elements.

9. The method of claim 1, wherein the at least one lane closure object is one of a construction object, a temporary sign, caution tape, and a flare, and wherein generating the predicted lane state includes determining that the at least one lane closure object is blocking a traffic lane, identifying map elements, and associating the predicted lane closure polygon and the at least one lane closure object with the map elements.

10. A system for evaluating lane closure zone detection, comprising:

a vehicle including:

an onboard computer configured to obtain map data for an area around a lane closure zone, wherein the map data includes travel lane information, a sensor suite configured to capture sensor data including a set of captured data frames of a lane closure zone, and a perception module of the onboard computer configured to identify at least one lane closure object in each of the set of captured data frames, and configured to fuse data from one or more interior sensors with data from exterior sensors, a zone modeling module of the onboard computer configured to generate a predicted lane closure polygon for the lane closure zone based on the at least one lane closure object and travel lane information, and generate a predicted lane state for the lane closure zone based on the predicted lane closure polygon, and wherein the onboard computer is further configured to transmit the set of captured data frames and the generated predicted lane states to a central computer; and the central computer configured to:

obtain map data for an area around a lane closure zone, wherein the map data includes travel lane information;

receive a labeled polygon indicating the lane closure zone;

generate a ground truth lane state for the lane closure zone based on the labeled polygon;

receive the set of captured data frames of the lane closure zone;

determine a difference between the ground truth lane state and the predicted lane state; and generate a performance metric based on the difference.

11. The system of claim 10, wherein the perception module is further configured to classify the at least one lane closure object for temporary traffic restriction attributes.

12. The system of claim 10, wherein the zone modeling module is configured to generate the predicted lane state by identifying map elements and associating the predicted lane closure polygon and the at least one lane closure object with the map elements.

13. The system of claim 10, wherein the at least one lane closure object includes a plurality of lane closure objects, and wherein the zone modeling module is configured to generate the predicted lane closure polygon by generating predicted edges of the predicted lane closure polygon based on the plurality of lane closure objects.

14. The system of claim 10, wherein the set of captured data frames includes, for each frame in the set of captured data frames, image data, LIDAR data, and RADAR data.

15. The system of claim 10, wherein the ground truth lane state is a first ground truth lane state for a closed lane, wherein the predicted lane state is a first predicted lane state for the closed lane, and wherein zone modeling module is further configured to generate a second predicted lane state for an open lane, and wherein the zone modeling module is further configured to generate a second ground truth lane state for the open lane.

16. The system of claim 10, wherein the lane closure object is an emergency vehicle, and wherein the perception module is configured to determine that the emergency vehicle is stopped and blocking a traffic lane, identify map elements, associate the predicted lane closure polygon and the at least one lane closure object with the map elements to generate the predicted lane state.

17. A computer system, comprising:

a computer processor for executing computer program instructions; and one or more non-transitory computer-readable media storing computer program instructions executable by the computer processor to perform operations comprising:

obtaining map data for an area around a lane closure zone, wherein the map data includes travel lane information;

receiving a labeled polygon indicating the lane closure zone;

generating a ground truth lane state for the lane closure zone based on the labeled polygon;

receiving a set of captured data frames of the lane closure zone from a sensor suite comprising a computer vision system, localization sensors, and driving sensors;

identifying at least one lane closure object in each of the set of captured data frames using a perception module of an onboard computer, and wherein the perception module fuses data from one or more interior sensors with data from exterior sensors;

generating a predicted lane closure polygon for the lane closure zone based on the at least one lane closure object and the travel lane information using a zone modeling module of the onboard computer;

generating a predicted lane state for the lane closure zone based on the predicted lane closure polygon using a zone modeling module of the onboard computer;

determining a difference between the ground truth lane state and the predicted lane state; and generating a performance metric based on the difference.

18. The computer system of claim 17, wherein the instructions further comprise classifying the at least one lane closure object for temporary traffic restriction attributes using the perception module of the onboard computer.

19. The computer system of claim 17, wherein generating the predicted lane state includes identifying map elements and associating the predicted lane closure polygon and the at least one lane closure object with the map elements.

20. The computer system of claim 17, wherein the ground truth lane state is a first ground truth lane state for a closed lane, wherein the predicted lane state is a first predicted lane state for the closed lane, and wherein the instructions further comprise generating a second ground truth lane state for an open lane and generating a second predicted lane state for the open lane.

* * * * *